United States Patent [19]

Niessen et al.

[11] Patent Number: 4,771,286
[45] Date of Patent: Sep. 13, 1988

[54] LAN CONTROLLER HAVING SPLIT BUS DESIGN

[75] Inventors: Leonard E. Niessen, Framingham; Allen C. Hirtle, Littleton; Edward Beauchemin, Marlboro, all of Mass.

[73] Assignee: Honeywell Bull Inc., Minneapolis, Minn.

[21] Appl. No.: 891,077

[22] Filed: Jul. 28, 1986

[51] Int. Cl.⁴ .................... H04Q 11/00; H04J 3/00
[52] U.S. Cl. ..................... 340/825.520; 370/85
[58] Field of Search .......... 340/825.52, 825.05, 340/825.5; 370/85, 88, 94

[56] References Cited

U.S. PATENT DOCUMENTS

| | | | |
|---|---|---|---|
| 3,993,981 | 11/1976 | Casserino, Jr. | 364/200 |
| 3,995,258 | 11/1976 | Barlow | 364/200 |
| 4,000,485 | 12/1976 | Barlow et al. | 364/200 |
| 4,001,790 | 1/1977 | Barlow | 364/200 |
| 4,292,623 | 9/1981 | Eswaran et al. | 340/825 |
| 4,430,651 | 2/1984 | Bryant et al. | 370/94 |
| 4,485,436 | 11/1984 | Austray et al. | 364/200 |
| 4,493,021 | 1/1985 | Agrawal et al. | 364/200 |
| 4,587,651 | 5/1986 | Nelson et al. | 370/88 |
| 4,590,468 | 5/1986 | Stieglitz | 340/825.52 |
| 4,652,874 | 3/1987 | Loyer | 340/825.05 |
| 4,654,654 | 3/1987 | Butler | 340/825.52 |

OTHER PUBLICATIONS

"Local Area Networks in Large Organization", T. W. Madron, pp. 1-45, published 1984, Hayden Book Co., Library of Congress Catalog 621.389M266.

"Business Communications", N. Mokhoff, published in IEEE Spectrum, Jan. 1982.

"An Introduction to Local Area Networks", D. Clark et al., published by Proceedings of IEEE, vol. 66, No. 11, Nov. 1978.

Primary Examiner—Donald J. Yusko
Attorney, Agent, or Firm—Nicholas Prasinos; John S. Solakian; George Grayson

[57] ABSTRACT

A split bus architecture which separates the processor/-processors and the procedure memory coupled to a microprocessor (μP) bus from all direct memory access (DMA) devices coupled to a DMA bus. A coupler mechanism provides bus isolation of the microprocessor bus from the DMA bus and permits the processor to access devices on the DMA side when addressed. This separation allows data transfers to proceed on one side of the bus without interfereing with software execution on the other side of the bus.

9 Claims, 20 Drawing Sheets

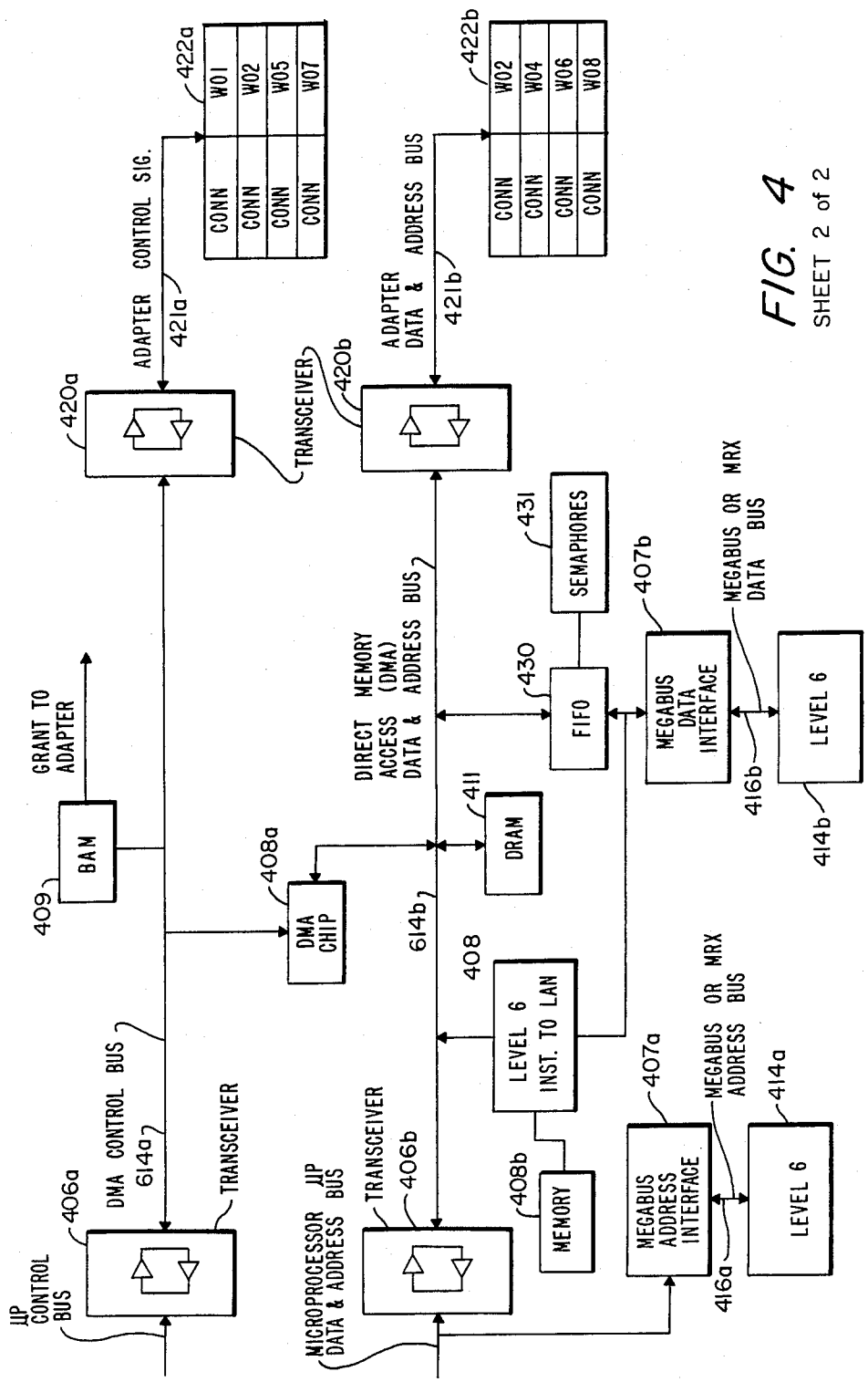
FIG. 4 SHEET 2 of 2

LAN CONTROLLER HAVING SPLIT BUS DESIGN

CROSS-REFERENCE TO RELATED APPLICATIONS

The following patent applications which are assigned to the same assignee as the instant application have been filed on an even date with the instant applications, have related subject matter. Certain portions of the system and processes herein disclosed are not our invention, but are the invention of the below named inventors as defined by the claims in the following patent applications:

| Title | Inventors | No. |
|---|---|---|
| A Controller for Controlling Multiple LAN Types | John W. Conway Robert J. Farrell Allen C. Hirtle Leonard E. Niessen | Ser. No. 891,511 |
| Lan Controller Proprietary Bus | Edward Beauchemin | Ser. No. 891,498 |
| Multi-CPU Interlock | Richard M. Collins Edward Beauchemin | Ser. No. 891,090 |
| Local Area Network Control Block | Allen C. Hirtle | Ser. No. 891,092 now Pat. No. 4750114 |
| Multiprocessor Interrupt Queueing Mechanism and Method | Kin C. Yu Richard M. Collins Allen C. Hirtle | Ser. No. 891,023 |

BACKGROUND OF THE INVENTION

1. Field of the Invention

This invention relates generally to an apparatus for data communication, and more particularly to local area networks (LAN) of computers that can communicate with each other regardless of the LAN architecture.

2. Description of the Prior Art

In many applications, both scientific and business, the growing use of digital computers processing data has proliferated the volume of data to such an extent that often a plurality of computers are required, each devoted to a different task with a need for communication between the computers in order to carry out their respective tasks. Historically computers have been used to process transactions of one form or another. Most computers through the early 1970s processed transactions in batches. Throughout the earlier days of computing, people calmly talked about batch processing as the processing of groups of punched cards. Each card was a transaction; the computer read the batch of cards and processed information in batches. During the 1960s people started to discuss interactive computing. With interactive computing, programs can be structured so that transactions are processed individually, rather than in batches. Interactive processing generally originates at typewriter-like data entry devices, called terminals. Batch terminals which read cards, tapes or disks and then send the data in batches to a computer, are often referred to as remote job entry terminals or remote batch terminals. Both batch or interactive processing can be done in networks that are centralized or distributed. A centralized network depends entirely on a central computing facility of one or more computers; while a distributed network divides tasks between one computing facility and another. Each intelligent entity in the network is called a node. Some nodes are computers, others are terminals, and still others may be communication devices of one form or another. Networks can be organized in a number of ways and it is possible for a single communications system to provide communications for two or more concurrently operating computer networks. There are many different types of network configurations. Some of the more common ones are as follows:

1. Point-to-point network

A point-to-point network is the simplest type of network and consists of a computer, communication line and a terminal or another computer at the other end of the line.

2. Multi-point network

The multi-point network is an extension of the point-to-point system and uses multiple point-to-point links to connect the stations to each other.

3. Star network

A star network is a centralized network wherein remote stations feed via separate point-to-point links into a single site at which the primary computing is accomplished.

4. Ring network

A ring network connects network nodes in a closed loop, with each node linked to those adjacent right and left.

5. Bus structure network

The bus network is logically configured with tabs, such as arms, branches and so forth, extending off of a central backbone. As a singal traverses the bus, every connection listens for the signal which carries an address destination. Typical bus systems are Ethernet and practically all broadband systems.

6. Hierarchical network

In a hierarchical network computers feed into the computers that in turn feed into other computers. The computers that are utilized as remote devices may have independent processing capabilities and may draw on resources at higher or lower levels as information or other resources are required.

These basic types of networks can be either global or wide area (WAN) covering great distances or they can be local area networks (LAN) covering relatively short distances, such as the computers in one or two buildings.

Although transmitted digital data can easily leap over entire continents in milliseconds, it sometimes takes them longer than that to travel the last mile or so within the building. Accordingly a number of solutions are being offered to this bottleneck in the local distribution of data in the form of local area networks (LANs) covering distances of 0.1 to 10 kilometers and can transmit data at rates from 100 kilobits per second to 10 megabits per second or higher. Every terminal node on the local area network (LAN) can communicate with every other node and the network requires no central node or processor. Prior to the introduction of these networks, office workers operating equipment from different vendors had to try to tie a system together in which there did not exist a common interface among the various terminals. Most prominent of the recently introduced LANs is Xerox's Ethernet, a base band system. (Base band systems impress the data signals directly on the medium, whereas broadband systems modulate a very high or ultra high radio frequency carrier with the data signal before impressing it on the communication medium.) Ethernet transmits data at 10 Mb/s up to a distance of 2.5 kilometers; it cannot handle voice or video applications.

WangNet from Wang Laboratories, on the other hand, is an example of a broadband topology that can accommodate all three applications—voice, data, and video at speeds equivalent to those of Ethernet. Wang-Net has a band width that spans the 10 to 350 Megahertz range. It also uses branching-tree topology where more nodes can be connected on the cable of longer distances.

Corvus Systems Inc. of San Jose, Calif., has introduced OMINET, which is a bus topology based on twisted-pair wires and is focused on connecting networks for personal computers. OMNINET transmits data at 1 mb/s and can accommodate up to 63 Apple II's. The computers can share from 1 to 6 floppy disk memories, which expands the memory from 5 to 10 Megabytes.

There are other LAN alternatives, such as HYPER channel from Network Systems Corp; NET/ONE; ARC; and others.

Since these base band and broadband systems are based on different proprietary configurations, standards for interfacing the equipment were needed. To avoid proliferation of interfaces, the IEEE's Standards Committee set up a subcommittee to adopt specifications for the interface unit between the terminals and the cable, as well as the logic protocols for accessing data on the cable and the data-enclocding schemes. Another organization, the International Standards Organization (ISO), also chartered a committee to study the compatability of network equipment which eventually led to the publication of the Open System Interconnection Reference Model (OSI). In the context of compatability, open system refers to a network model open to use in equipment from competing manufacturers. The OSI model divides networking issues into the functions of the layers. There are 7 layers in the OSI model, numbered from layer 1 through 7.

Layer 1 is the physical layer and defines the electrical and mechanical characteristics of the network, such as the media used, the modulation techniques, frequencies at which the network operates and the voltages employed.

Layer 2 is the data link layer and defines the access strategy for sharing the physical medium that connects the various nodes. Common LAN techniques include carrier sense multiple access collision detection (CSMA/CD) and token-passing schemes. Additionally, techniques for placing network-specific information and data packets, such as node address, are functions of Layer 2.

Layer 3. Not all LANs require Layer 3. However networks that requires routing mechanisms among nodes located on interconnected LANs must have Layer 3. On a single LAN broadcast data is seen by every node and accordingly a particular connection collects those packets properly addressed to it without a need for routing.

Layer 4 is the transport layer which deals with fundamental level of reliability and data transfer. This layer is concered with flow control, error handling and problems involved with transmission and reception of packets. (A packet is composed of user-originated data plus any information the network needs to transport user data from one network node to another).

Layer 5 is the session layer and is of particular importance to LANs. When a link is made between two devices, a session is established. Accordingly the session layer provides for the establishment and termination of streams of data from two or more LAN connections or nodes.

Layer 6 is a presentation layer and is the layer where services such as protocol conversion, data unpacking, translation, encryption, character set changes, or conversions, and the expansion of graphic commands take place.

Finally Layer 7 is the application layer. All layers from 1 to 6 are designed to support this layer. Electronic message systems, terminal emulation capabilities, and file transfer programs are examples of software that may be operating at Layer 7.

With such a proliferation of equipment, networks and standards, it becomes necessary to have a local area controller system such that regardless of the physical layer local area network (LAN) connections, the software related to the transport layer, network layer, and logical link control layer would be unchanged, transparent, and isolated from both sides; i.e., the controller's bus side which pertains to the Level 6 computer system*, and from the controllers's communication adapter side which pertains to various types of LANs, such as Ethernet, token ring or token bus.

*A commerically available computer system from Honeywell Information Systems Inc.

More specifically it was necessary to design a Local Area Network Controller (LANS) which could provide interface software to support the transport layer, network layer and logical link control layer software so that it will not be necessary to change this software when some new type of LAN connections were made to it. Moreover the design should be such that it would make the hardware interface of the controller with the Level 6 processor's hardware transparent to the layer software. It was necessary, therefore, to isolate the communications layer software from both sides of the hardware, thus permitting various types of adapters to handle CSMA and Ethernet, or token ring or token bus LAN architectures; and moreover that at some future date could be utilized to support a PBX adapter.

(Portions of the above information were obtained from the following sources:

(1) "Business Communications", by Nicholas Mokhoff, published in IEEE Spectrum, January 1982;

(2) "Local Area Networks in Large Organizations", by Thomas Wm. Madron, published by Hayden Book Co., 1984; and (3) "An Introduction to Local Area Networks", by David D. Clark, Kenneth T. Pogran, and David P. Reed, published by Proceedings of the IEEE, Vol. 66, No. 11, Nov. 1978.)

Some typical prior art devices related to Local Area Networks (LANs) are cited below. However, no representation is made that an exhaustive search of the prior art has been made or that this is the closest prior art.

(1) Multicomputer Communication System by Anil K. Agrawal et al, issued Jan. 8, 1985, and having U.S. Pat. No. 4,493,021.

(2) System for Selecting Interfaces on a Priority Basis by Pierre Austray et al, issued Nov. 27, 1984 and having U.S. Pat. No. 4,485,436.

(3) Port Logic for a Communication Bus System by Kapali P. Eswaran et al, issued Sept. 29, 1981 and having U.S. Pat. No. 4,292,623.

(4) Expandable and Contractible Local Area Network System by David M. Bryant et al, issued Feb. 7, 1984 and having U.S. Pat. No. 4,430,651.

Baseband prior art systems such as Ethernet and practically all broad band systems are of the bus type logically configured with tabs, such as arms, branches, etc., extending off a central backbone. Coupled to the bus may be a variety of devices, such as CPUs, ROMs, PROMs, EPROMs, RAMs, DMA devices, etc. Previous designs usually comprise one bus which services both central processing units (CPUs) and direct memory access devices (DMAs). This type of architecture restricts data bandwidth and precludes simultaneous operation of multiple high speed LANs attached to the controller. What was needed was an architecture for a bus that would permit simultaneous operation of multiple high-speed LANs.

OBJECTS OF THE INVENTION

It is a primary object of the invention therefore to provide an improved type of bus architecture.

It is a further object of the invention to provide a bus architecture that would provide simultaneous operation of multiple high speed LANs attached.

It is yet another object of the invention to provide a bus architecture that would not restrict data bandwidth.

SUMMARY OF THE INVENTION

In accordance with the above and other objects of the invention, a split bus architecture is utilized which separates the processor and its procedure memory from DMA devices. A LAN board is made up basically of three busses—a microprocessor bus, a DMA bus and an adapter bus. A coupler mechanism provides bus isolation of the microprocessor bus from the DMA bus and permits the processor to access devices on the DMA side when addressed. This separation allows data transfers to proceed on one side of the bus without interferring with software execution on the opposite side of the bus.

When a DMA transfer is performed from a Level 6 device attached to the bus to a DMA memory under control of a $\mu/P$, data is transferred via Megabus data interface into a FIFO memory and onto the DMA bus. Then a DMA control chip transfers data on the DMA bus into the DMA buffer memory. In the meantime the $\mu/P$ is isolated from this DMA transfer via a transceiver. Thus the $\mu/P$ can simultaneously perform some other task utilizing information from its DRAM.

The above and other objects and features of the present invention are achieved in the illustrative embodiment described hereinafter. The novel features which are believed to be characteristic of the invention, both as to the organization and method of operation, together with other advantages thereof, will be better understood from the following description considered in connection with the accompanying drawings. It is to be understood, however, that each of the drawings are for the purpose of illustration and description only and are not intended as a definition of the limits of the invention.

ARCHITECTURE

Overview

The Local Area Controller Subsystem (LACS) is a programmable communications subsystem that connects to the Honeywell Level 6 Megabus system, see U.S. Pat. Nos. 3,993,981; 3,995,258; 4,000,485; 4,001,790; and 4,050,097, issued to the same assignee as the instant invention. LACS comprises the following set of communication components:

(a) Local Area Controller (LAC) Motherboard
(b) Media Access Controller (MAC) and Physical Layer Adapters
(c) Truck Couplers (TCs)
(d) RF Modems.

The disclosure of this invention pertains to the definition and description of the first two items above (i.e., the LAC and the adapters).

The LACS is intended to be capable of supporting any of the IEEE 802 Local Area Network Standards. The design of the LACS minimizes the interactions required over the Honeywell Level 6/LACS interface and isolates the LACS on-board communications software from the specific hardware characteristics of the Level 6 (L6) and LAN adapter interfaces. A communications kernel bases on one commercially available from Bridge Communications Inc., is used as the Operating System (OS) within the LAC. In this disclosure "CS Software" (Communication Service) refers to LAC-resident software which implements the Open System Interconnection (OSI) Link, Network and Transport layers; "SM Software" (System Management layer instance) refers to LAC-resident software which supports IEEE 802 System Management functions.

Although the IEEE 802 Standard goes no higher than a standard data link control interface (Layer 3/Layer 2), the Level 6-to-LACS interface that is provided is so flexible as to be readily adaptable to support the higher (e.g. Session/Transport) layer interfaces.

The LACS, used for all Local Area Network (LAN) applications, is mounted in a standard Honeywell Level 6 chassis and requires one slot on the Megabus* system; it will support the 32-bit address bus of the larger Level 6 systems. The LAN adapters provide an interface from the LAC to the LAN. The adapter (a daughterboard) includes a Media Access Controller (MAC). The LAC provides for the attachment of up to four adapter daughterboards. The adapters are of several types (e.g., Token Bus MAC, CSMA/CD MAC, etc.).

*Megabus is a registered Trademark of Honeywell.

The Trunk Couplers (TCs) are of several commercial types (for example, broadband directional coupler, token ring, Ethernet transceiver) and are packaged as separate units. The RF modem, used for broadband applications, is also separately packaged.

Because of its ability to support adapters of similar or dissimilar types, the LACS can be used not only for IEEE 802 LAN connection with a Level 6 but also in the future as a gateway between IEEE 802 LANS, or, in the case of broadband LANs, as a bridge between broadband channels. Other applications for the LACS could be as LAN traffic monitor/journalizer and network control. The Communication (CS) and System Management (SM) software would, of course, be tailored for each application.

Figure 1:
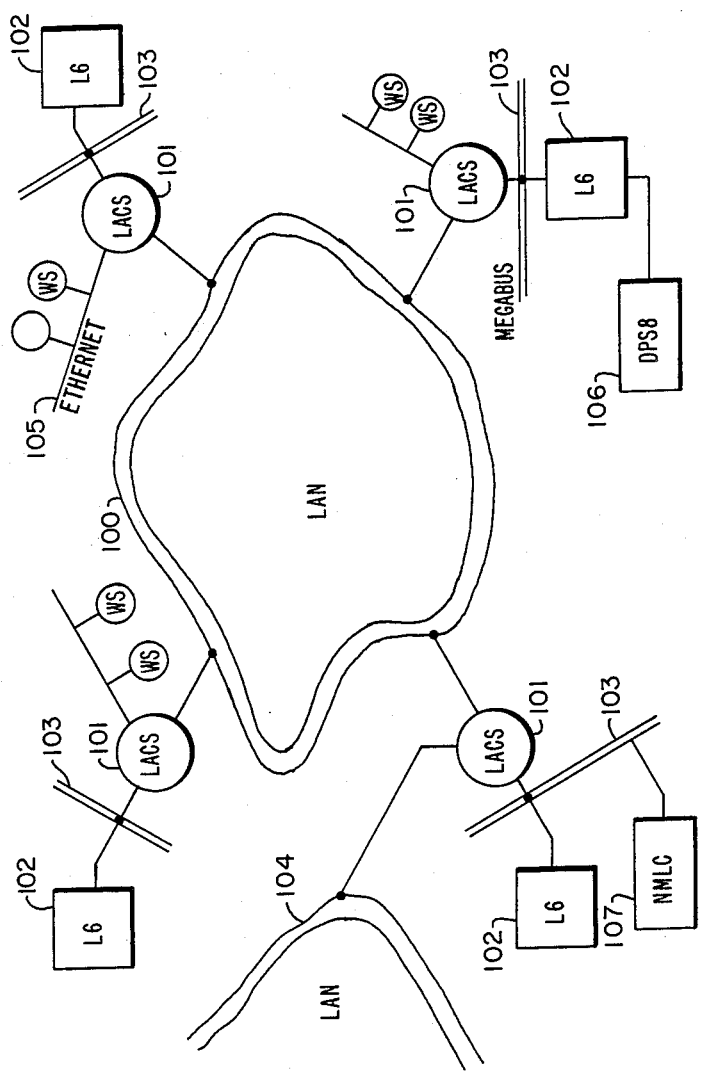
FIG. 1 is a schematic diagram of a LAN system utilizing the invention.

FIG. 1 shows a Local Area Network with LACS providing connections with Level 6 systems, for workstation LAN access, and for Gateway between LANs.

In FIG. 1 the LAC 101 provides for multiprocessor central systems having up to 16 processors in its input-/output (I/O) interface. The LAC 101 provides connections for the Level 6 (L6) system 102, and the LAN 100, wherein the LAC 101 interfaces with the L6 102 via the Megabus 103. Additionally the LAC 101 acts as a gateway to other LANs, such as LAN 104 or Ethernet 105. Under control of a Level 6 CPU it may service other communication needs, such as those on behalf of the new multiline controller (NMLC) 107, and mainframe computer systems, such as the DPS 8 106.

Figure 2:
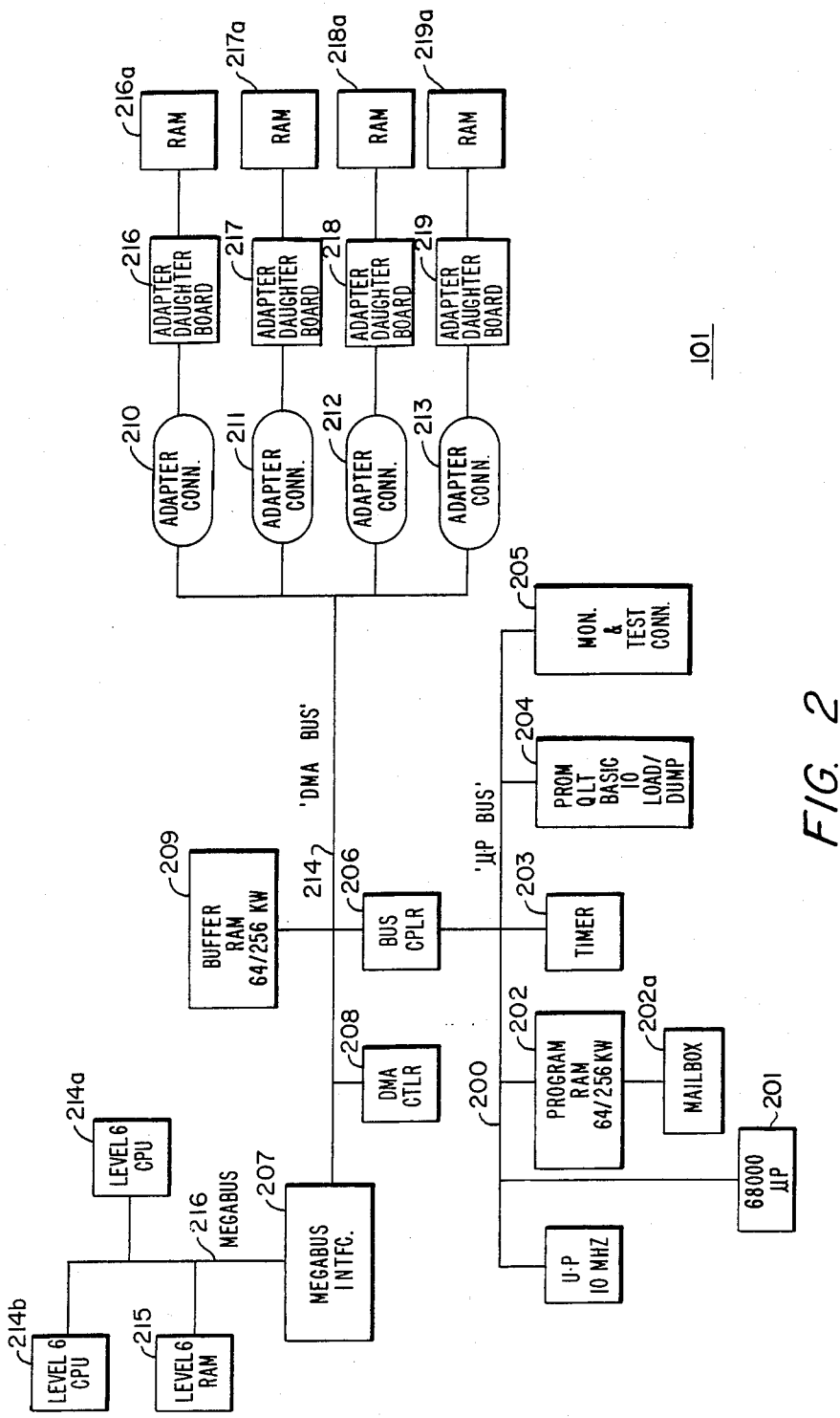
FIG. 2 is a block diagram of the invention.

In FIG. 2 there is shown a more detailed block diagram of the LAC 101. A commercially available microprocessor (MC 68000) 201 is coupled to a microprocessor bus (u/p) 200 and communicates via bus coupler 206 with adapters through adapter connections 210–213. A commercially available RAM 209 is coupled to DMA bus 214 and communicates to microprocessor bus (u/p) 200 via Bus Coupler 206. The RAM is physically separated into two sections: a data buffer RAM and program RAM. The intent of the separation is to allow for simultaneous Direct Memory Access (DMA) of data in the data buffer RAM with the Level 6 memory or with the LAN adapters along with software execution in the program RAM. The BUS Coupler 206 is a commercially available transceiver type 74LS245, which isolates u/p Bus 200 from the DMA bus 214 and allows for simultaneous independent operation of the MC 68000 busses 200, 214 on each side, yet permits the microprocessor to perform accesses to any location in the total RAM 202, 209.

The DMA controller 208 is a 68440 commercially available controller from Motorola and is a two-channel device; one channel is used by the microprocessor 201 to perform the DMA movement of data between Level 6 main memory 215 through Megabus interface 207 and the data buffer RAM 209. The othe channel is used to accept I/O order information from the Megabus 216 and deliver it to a temporary queue in the data buffer RAM 209 for further analysis and disposition by firmware or interface (IF) software.

The timer device 203 is type 9513 and is commercially available from Advanced Micro Devices; it provides the basic clock tick for the LAC operating system to use in providing timer functions for LAC software (not shown).

DMA functionality for the adapters is provided by hardware located on the adapters themselves. Adapter DMA is always into or out of the data buffer RAM.

Data movement between the program RAM 202 and the data buffer RAM 209 is performed directly by the MC 68000 microprocessor 201; data movement between the program RAM 202 and main memory 215 (as in Load/Dump operations) is performed in two steps: a movement between program RAM 202 and data buffer RAM 209 under control of the microprocessor 201, and a movement between data buffer RAM 209 and main memory 215 performed by the DMA controller 208.

Figure 3:
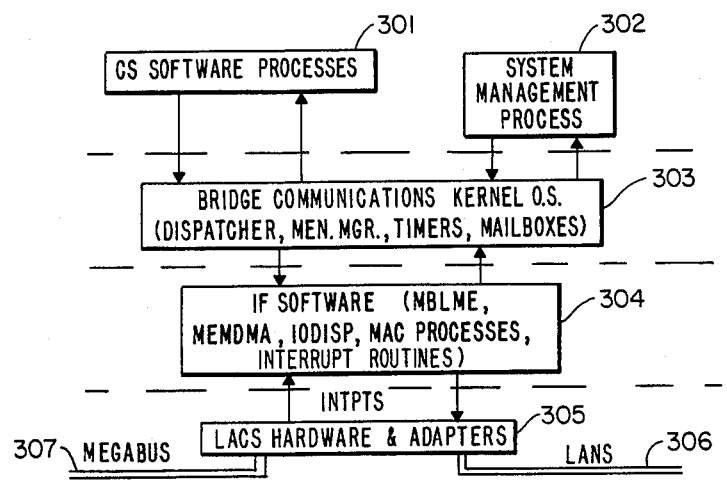
FIG. 3 is a block diagram of the operating structure of the invention.

Although not necessary to the invention, FIG. 3 is presented to better understand the structural relationships of the Operation System (OS), the Bridge Communications Kernel OS and the Interface (IF) software and the hardware.

FIG. 3 reflects the thrust of the functionality described throughout this specification in which CS and SM software 301, 302 respectively does not directly control the LAC hardware but instead interfaces with it through IF software 304 processes and routines. This IF software isolates the CS and SM software from the particular characteristics of the hardware so that future reimplementations of hardware (e.g., with larger-scale LSI parts) need not affect that software. All LAC software is loaded into the LAC Program RAM 202.

In this specification IF software is described as consisting of processes or interrupt routines according to whether the particular piece of software is invoked by a mailbox message being sent to it or is normally invoked by the occurrence of an interrupt from the LAC hardware. From the viewpoint of the OS 303, these IF "interrupt routines" are either associated with an IF mailbox-invoked process (to be described infra) or are a process which consists essentially of only an interrupt agent.

The IF software MEMDMA and IODISP processes have associated with them a Megabus Layer Management Entity (MBLME) to which those processes report various unusual events or faults. MBLME may in turn report certain of these events to SM software; it also serves generally as the intermediary between SM and those processes.

The IF software 304 MAC processes consist of a MAC Transmit, Receive, and Layer Management process for each physically attached adapter.

CS software 301 provides Transport, Network, and Link layer functions for the LAN connection(s). Each of these layers and layer instances has a layer management entity associated with it which performs functions analogous to MBLME.

SM software provides overall control and system status reporting for the LACS layer management entities and with System Management software in the CPU.

OS Kernel software provides service functions such as timers and controls the dispatching of processes and passing of mailbox messages. The handling of error responses from the Kernel for the various procedure calls is sent to it by CS and IF software.

The LAC also contains some PROM-resident firmware (not shown on this Figure) which provides for QLTs, RAM load/dump and basic I/O orders.

Interprocess communication (to be more fully described infra) is accomplished via mailbox messages utilizing OS SENDMSG Procedure Calls. They are the means whereby one process may send a messary or request service of another process. They are also the means whereby the occurrence of asynchronous events or the completion of asynchronous services are made visible to the software so that software processing can proceed to its next step. The called process will retrieve messages sent to its mailboxes. Software processes may obtain the ID of their own mailboxes; they may also obtain the ID of another process' well-known registered mailbox.

The Bridge OS 303 provides a number of priorities for mailbox messages which affect the relative position of message in a mailbox queue. The available message priorities are URGENT, NORMAL, MUST DELIVER, and FAST.

The LAN Control Block (LCB) (to be described infra) is the prime vehicle of intercommunication between the Level 6 CPU and the LACS. The OS/SM software interface 301, 302 with the Megabus is supported through mailbox messages received from the IF softward I/O Dispatch process 304 and through mailbox messages sent to the IF Software. The mailbox messages received consist essentially of pointers to LCBs in main memory 215. The mailbox messages to the Memory DMA process are used to cause movement of data between main memory 215 and the LAC Data Buffer RAM 209, or to read in LCBs, or to write status type information into LCBs in memory 215 and interrupt the CPU.

The CS/SM software interface with adapters is supported through mailbox messages generated by the IF Software Media Access Controller (MAC) processes (i.e., Data Indicate and Control Indicate) and through mailbox messages sent to IF Software MAC processes.

The software interface between Level 6 and the LACS during normal running uses input/output load (IOLD) orders addressed to the LACS and return status information delivered to main memory by the LAC accompanied by interrupts to the Level 6.

All of the data message and Administrative and Management operations are based on the use of LAN Control Blocks (LCBs) located in main memory 215 and which are pointed to by information given in IOLD orders. The appropriate software process in the LAC will cause the LCB to be copied into the RAM as an LCB LAN control block Image (LCBI), and after completing the requested operation, will cause final status to be delivered to the LCB. In carrying out the operation the process will make use of various other processes.

DETAILED DESCRIPTION OF THE PREFERRED EMBODIMENTS

Figure 4:
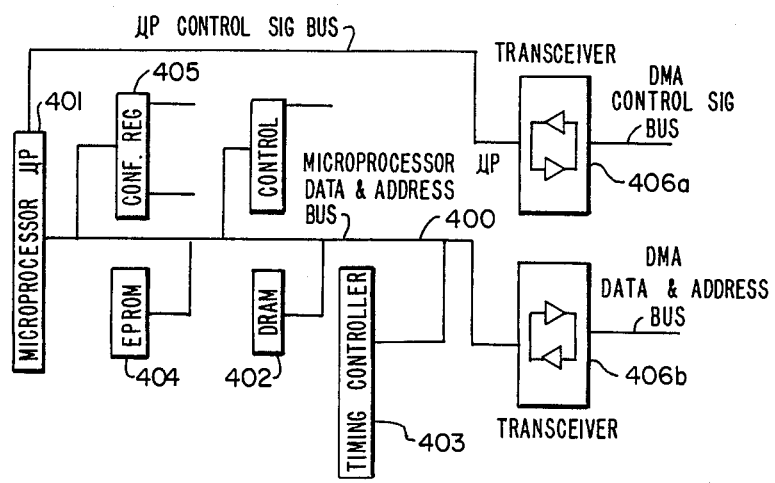
FIG. 4, sheets 1 and 2, is a logic block diagram of the split bus feature of the invention.
Figure 5:
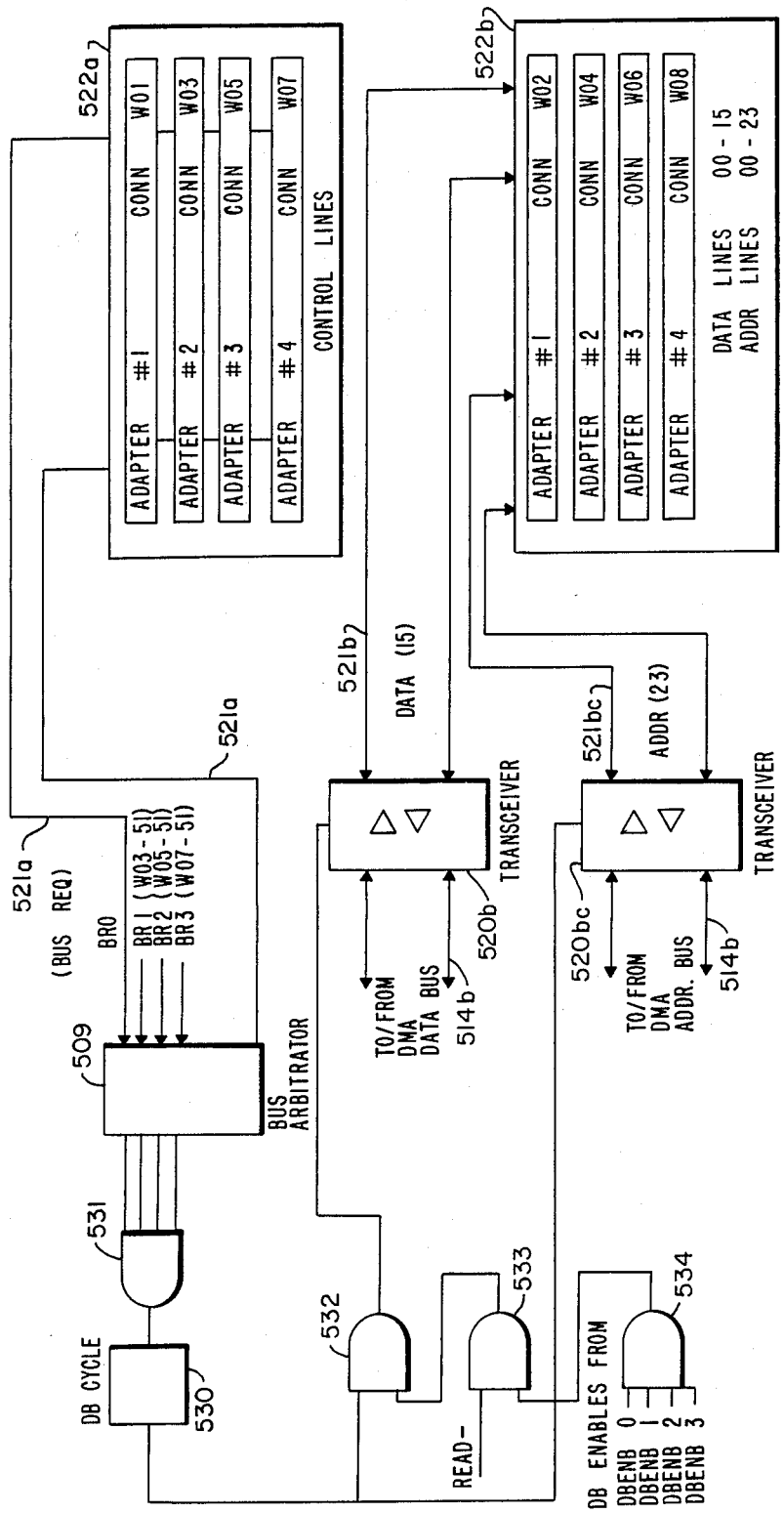
FIG. 5 is a logic block diagram of a LAN controller proprietary bus of the invention.
Figure 6:
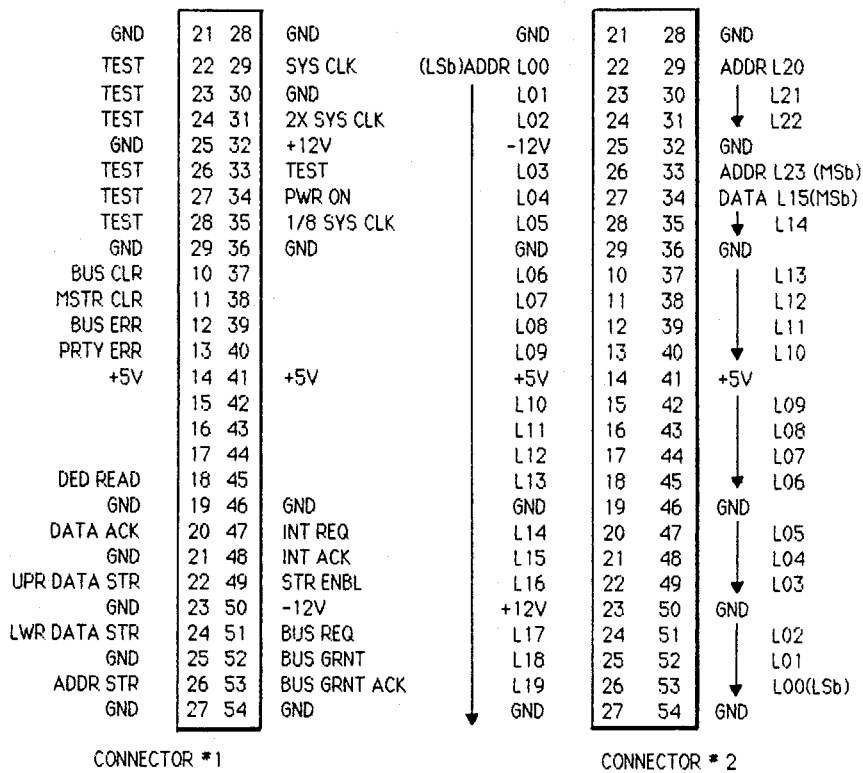
FIG. 6 is a diagram of the physical interface which is used between the LAC and attached adapters.

The LAC is made up basically of three busses as shown on FIGS. 4, 5 and 6 and comprise basically a microprocessor ($\mu$/p) bus 400 on FIG. 4; a direct memory access (DMA) bus 614a, 614b; and an adapter bus 521a, 521b, 522a, 522b on FIG. 5 and connectors 1 and 2 on FIG. 6. These busses comprise up to 16 data bits, two parity bits and 23 address bits and include a control bus which contains a data strobe, address strobe, a read/write line, and function code lines.

Referring now to FIGS. 4 and 5, there is shown a Motorola-type microprocessor ($\mu$/p) 401 which operates under control of an Operating System (OS) which is stored in a commercially available dynamic random access memory (DRAM) 402. This operating system OS controls data flow from DMA bus 614b to adapter data and address bus 421b and the Megabus 416b. (This will be discussed more fully when the adapter bus is discussed infra.)

The commercially available erasable programmable read only memory (EPROM) 404 is 16K $\times$ 16 bits wide and is a commercially available 27128 type. The EPROM 404 contains a quick logic test (QLT) and a stack pointer to the microprocessor 401. The EPROM 404 also sets up the Motorola-type 68440 DMA chip 408 to transfer a block of I/O instructions from the Level 6 computer system 214a, 214b, 215 for storage into the 64K $\times$ 18 dynamic random access memory (DRAM) 411 to be utilized by the Motorola 68000 ($\mu$/p) 401 to execute these Level 6 instructions. The Level 6 CPU 214a/b also loads the operating system (OS) into dynamic random access memory (DRAM) 402, which will be utilized by the microprocessor ($\mu$/p) 401 to execute programs and instructions.

In order for the Level 6 system shown on FIG. 2 by reference numerals 214a, 214b, 215 and on Sheet 2 of FIG. 4, 414a, 414b to communicate with the LAC via Megabus 216, 416a, 416b, the Level 6 CPU 214a/b issues the LAC an instruction via a 74AS867/26S10 type Megabus interface 407a, 74AS823/26S10 type interface 407b. The instruction is received by a 74AS823 type register as a function code. The Level 6 CPU 414a places addresses on the address interface 407a, while the Level 6 CPU 414b places the data in the data interface 407b. Thus data is placed at the inputs of the FIFO 430 and instructions are placed at the inputs of controller. When the instructions are placed in the controller 408, a signal is sent to DMA chip 408a for a request to obtain control of the DMA bus 614b. The DMA chip 408a acknowledges the request and permits the controller 408 to place data on the DMA bus 614a, 614b. The DMA chip 408a then addresses the memory 408b of controller 408 and transfers the DMA data into DRAM 411. When the procedure is accomplished, the DMA chip 408a will permit the microprocessor 401 to execute. The microprocessor 401 will then request the DMA bus and if it is granted, it will transfer data from memory 408b for further processing and analysis.

In order to transfer data from the Honeywell Level 6 system 102 to the LAN 100 via LACS 101, the $\mu$/p 68000 first loads a Level 6 starting address into Megabus address interface 407a. Within the Megabus address interface 407a there is a range counter which counts the number of words to be loaded into memory 408b. Then the $\mu$/p 401 loads an DMA address into the DMA chip 408a. The DMA address thus loaded addresses memory 408b. It also loads a range count for the number of words to be loaded into the memory 408b. Then under control of the $\mu$/P 401, data is transferred via Megabus data interface 407b into the first-in-first-out (FIFO) memory and onto the DMA bus 614b. Then the DMA chip 408a transfers the data on the DMA bus 614b into the DMA buffer memory 408b. In the meantime the $\mu$/p 401 is isolated from this DMA transfer by a 74LS245 transceiver 406b. Thus the $\mu$/p 401 can simultaneously perform some other task utilizing information obtained from DRAM 402. When the DMA transfer is performed from the Level 6 to the DMA memory, the DMA chip 408a interrupts the μ/p 401. The μ/p 401 then issues a command onto the DMA bus 614a 614b and onto adapter bus 421a, 421b via 74LS245 type transceivers 420a, 420b. The adapter receiving the command then reads the DMA memory 408b and transfers data from the DMA memory 408b into one of the adapters 422a, 422b and onto the LAN 100. While this procedure is taking place the μ/p 401 is isolated from both the DMA bus 614a, 614b and the adapter bus 421a, 421b via transceivers 406b, 420a, 420b, respectively. The μ/p 401 then proceeds to operate under its operating system OS and sets up the next block of transfer for the DMA chip 408a to take place. The transceivers 406b permits the microprocessor bus 400 to run, under control of its program, the DMA bus, and to perform transfers from either the Level 6 memory 215, the Megabus 216, to the DMA memory 408b. Thus this isolation of busses allows all three busses to run concurrently without interference. It makes the LAN very versatile and provides greater throughput through the LAC.

Referring now to FIGS. 5 and 6, there is shown a block diagram of the adapter interface comprised of adapter daughterboard connections 210-213 (see also FIG. 2) and adapters' daughterboards 216-219. The total LAN board comprising the adapter interface system may have up to four daughterboards 522a, 522b. Each daughterboard has A odd and even connectors. For example, daughterboard #1 (adapter interface #1) has adapter connections W01 and W02; daughterboard #2 (adapter interface #2) has connections W03 and W04, etc. Odd connections handle the control lines; whereas even connections handle data lines 0-15 and address lines 00-23. Adapters' daughterboards may be of any type from Ethernet, token ring, token bus, disks, tapes, memories, etc.

The adapter bus 421a, 421b, 521b are isolated from the DMA bus 414b, 514b by a commercially available 74LS245 type transceivers 420a, 420b, 520b, 520bc. In the case where the DMA bus wishes to send data to the adapter bus, the transceiver would permit data flow in that direction; whereas the transceiver would point in the other direction when the adapter bus wishes to send information to the DMA bus. Each adapter daughterboard 216-219 on connector (210-213) would like to send or receive data from the LAN; that adapter request to the DMA bus and a 68452 type arbitrator chip 509 determines which one of several requests has the highest priority, and then awards the bus to that adapter having the highest priority. It would also send a signal to a 7474 flip-flop type chip via 74S20 type gate 531. The flip-flop 530 when set, indicates that a daughterboard (adapter) cycle is in progress. The signal is then applied to transceivers 520b, 520bc via gates 532, 533 where they are gated with a read/write signal. The read/write signal applied to gates 532, 533 determines in which direction data will be transferred via transceivers 521b, 521bc—i.e., whether the DMA bus data will be placed on the adapter bus or whether the adapter bus data will be placed on the DMA bus. When this data transfer is complete, the next-highest priority adapter may start its cycle.

Data transfers may also take place to or from the adapter by utilizing enable signals from transceiver 406b. Under this technique of data transfer the μ/p 410 programs the transceivers 406b with adapter enable signals. Accordingly the μ/p 401 may read or send data to the adapters under its control via transceiver 406b. Accordingly this type of isolation via transceivers 520b, 520bc, and selection via transceiver 406b, permits the LAN to be programmed by the μ/p 401 to utilize any type of daughterboards (adapters) on the LAN.

Referring to FIG. 6 there is shown the physical interface between the LAC and the attached adapters. The adapter interface is made up of connectors W01-W08. FIG. 6 shows two typical connectors. All even connectors W02, W04, W06, W08 contain data bits 0-15 and address bits 1-23. All the odd connectors W01, W03, W05, W07 handle control signals. On the odd connectors, connector terminal 10 is a bus clear signal; connector terminal 11 is a master clear signal; whereas connector terminal 12 is an indication of a bus error. Connector terminal 13 handles parity error signals; whereas read/write signals are applied to connector terminal 18. Data acknowledge signals are applied to terminal 20. An upper data strobe signal is applied to terminal 22; whereas a lower data strobe signal is applied to terminal 24. A data address strobe signal is applied to terminal 26. Terminal 29 handles signals for a system clock; whereas terminal 31 handles signals for 2×2 the systems clock. Terminal 35 handles signals for ⅛ the system's clock rate. Power-on signals are handled via terminal 34. Interrupt request signals from the adapter are applied to terminal 47, and interrupt acknowledge signals to the adapter are applied to terminal 48. The enable strobe signals to the adapter are applied to terminal 49. Bus request signals from the adapter are applied on terminal 51, and bus grant acknowledge signals to the daughterboard are applied at terminal 52; whereas bus grant acknowledge from the adapter to the LAN are applied to terminal 53. The terminals are connected to identify various data lines and address lines.

INPUT/OUTPUT (I/O) ORDERS

In order to provide control of the LACS by the Level 6 CPUs 214a, 214b, a set of Input/Output (I/O) orders are utilized with distinct function codes (FC).

| | | Output Orders | |
|---|---|---|---|
| 1. | IO | (FC = 01) | Output LACS Control |
| 2. | IOLD | (FC = 09/OD) | Output LCB Pointer |
| | | Input Orders | |
| 1. | IO | (FC = 26) | Input Device ID |

Output LACS Control I/O (FC=01)

This order transfers a 16-bit control word to the LACS. All adapters and interfaces are affected by this order. The channel number used in the order is immaterial. The bits in the word are defined as follows:

Bit 0: Hard Initialize (if a one)
Bits 1: Stop I/O (if a one and bit 0 is a zero)
Bits 2-15: MBZ The Hard Initialize function is initiated by a power-on sequence or by the Output LACS Control Order (which is the first bit of the order) is a One; i.e., FC=01. This initialization function causes the following actions:
(a) The LAC and adapter RAMs 202, 216a-219a are cleared.
(b) All hardware registers in the LAC and adapters are cleared.
(c) The LAC runs its quality logic test (QLT) and ascertains the appropriate configuration information.

(d) The LAC enters a stop condition in which its functionality consists of those functions supported by the PROM 204.

If Bit 1 or the I/O order is a One and Bit 0 is a Zero, then a Stop I/O is performed which causes the following actions:
(a) Hardware registers in the LAC and adapters are cleared.
(b) The LAC commences or continues operation under firmware control in which the functionality consists of those functions supported from PROM resident firmware 204.

Output LCB Pointer IOLD (FC=09/OD)

The IOLD instruction is made up basically of two function codes. The function code 09 when present pertains to the loading of an address; whereas the function code OD when present pertains to the load range. This order involves two separate bus transfers to the LAC. The first transfer is a 32-bit byte address and the second is a 16-bit range word of which the high order 8 bits are interpreted as defining a LAC hardware/software function and the lower order 8 bits define the LCB size in bytes. Together the address and LCB size define the location and size of a LCB in Level 6 main memory 215. When the Level 6 CPU 214a or 214b issues an IOLD, the Megabus 216 places the 09 function code on Megabus address bits 18–23. The LAC accepts this function code and stores it onto the motherboard of FIGS. 2, 5. The next function code that the LAC will respond to is the OD function code which completes the IOLD instruction.

One main problem that arises with respect to the issuing of IOLD orders is in a multiprocessing system. Without an interlock, IOLD orders could be issued from two CPUs and these IOLD orders could be interleaved because the LAC would not know how to pair the function codes 09 plus OD sent from each of the two CPUs. The interlock causes a NAK to the second CPU which prevent ambiguous cycles and insures that all IODLs are from the same CPU.

Figure 7:
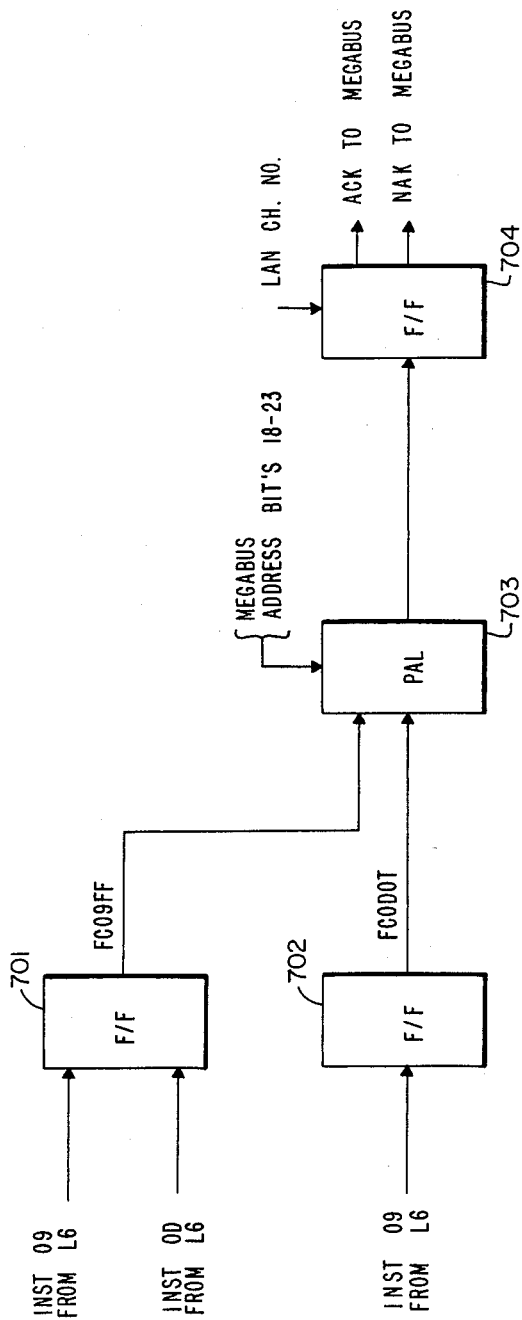
FIG. 7 is a logic block diagram of a multiCPU interlock feature of the invention.

Referring now to FIG. 7 there is shown a commercially available 74S112 flip-flop 701 which stores a first function code 09 from a first IOLD order. An output signal from the fkip-flop 701 is applied to a commercially available 16L8 type Programmable Array Logic (PAL) 703; also applied to the PAL are Megabus address bits 18–23. The PAL 703 decodes the function codes and decides whether or not the function code that was issued from the Level 6 should be acknowledged (ACKed) or not acknowledged (NAKed). When this decision is made, it is then stored in a 74S823 type latch 704. This latch acts as a semaphore which can queue information from the bus so that the bus can be released and the information utilized at the appropriate time. The latching of the circuit semaphore 704 is decided when the LAN detects the instruction was for the LAN board. Flip-flop 701 is reset to function code OD in order to end the cycle. The flip-flop 701 may be considered a type of bracket which gets set with fucntion code 09 and reset with function code OD. PAL 703 decodes the function bits and decides which function codes are to be ACKed or NAKed to the Megabus. Thus this logic prevents a first CPU issuing an IOLD and a second CPU issuing an IOLD with each CPU receiving the wrong acknowlegment. In order to NAK, any input instruction after an IOLD has been given control of the LAN board, a flip-flop 702 is utilized. It is used as a semaphore which will set on the first IOLD function code 09 and can reset only when there is a master clear signal applied to it. Hence the semaphore 702 prevents the Level 6 input instructions to be issued once the LAN board has given control to the IOLD instructions.

Immediately following completion of an Output LACS Control Order (FC=01), an Input Device ID Order (FC=26) may be issued to cause the LAC PROM 204 to deliver a 16-bit device ID word to the Megabus. This ID identifies both the LAC and the adapter attached to the addressed Adapter Channel. The LAC is assigned a set of 64 channel numbers. For the input device ID order (FC=26), the 6 least significant bits of the channel address are treated by the LAC as consisting of two fields as follows: the highest 2 bits specify the adapter's daughterboard position and the lowest 4 bits specify a subchannel associated with the adapter 216–219. The channel number coding for the input device ID order is accomplished by utilizing a format having 10 bits 0–9. The LAC board address is identified by a code located in the first 4 bits; the adapter position is identified by a code having 2 bits in bit positions 4–5; and finally the subchannel on the adapter is identified by 4 bits in bit positions 6–9.

DATA TRANSFERS

One of the main problems in the design of the LAC was to have resident communications layer software in the LAC that would remain unchanged regardless of which type of LAN connections were made to the system. Accordingly it was necessary to isolate the resident software from the Level 6 Megabus side and from the LAN interfaces. The hardware that is chosen to do this and still maintain communications the LAN and the Level 6 and also communications within the LAC controller itself, were the LAC Control Blocks, typically shown on FIG. 8 and 9 and FIGS. 10–13.

Figure 8:
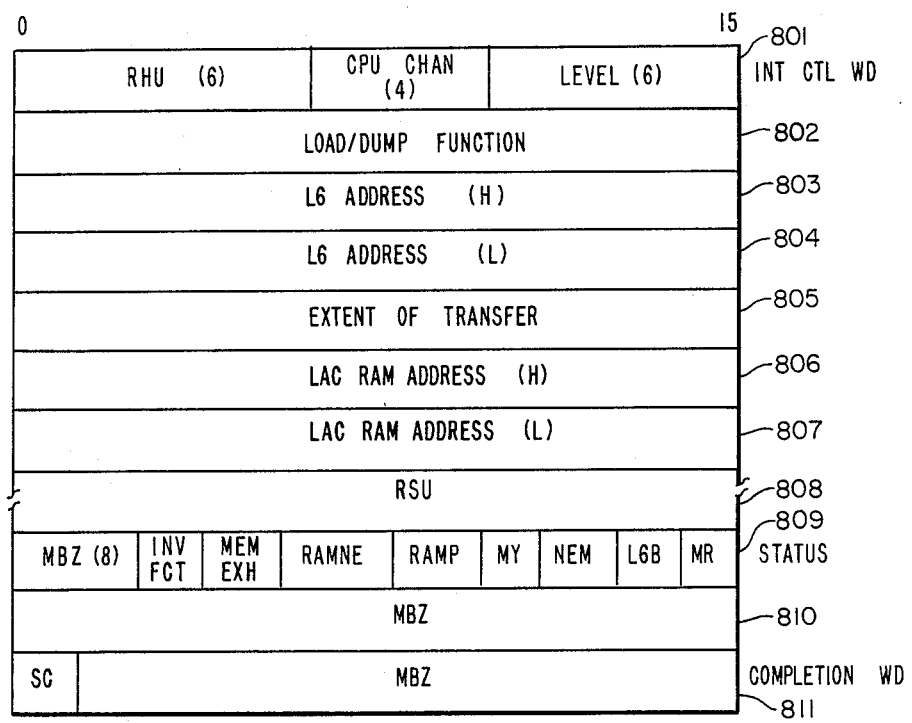
FIG. 8 is a schematic diagram of a LAC control block for loading/dumping of LAC software from main memory.

Referring now to FIG. 8, there is shown a LAC Control Block for loading/dumping of LAC software from main memory, for dumping various portions of LAC RAM 202 into main memory 215, and for retrieving certain configuration information from the LAC. The operation is commenced via an output LCB Pointer IOLD previously described. The format of the LAC Control Block on FIG. 8 has words which are 16 bits wide, with the first word 801 being divided so that the first 6 bits are reserved for future hardware use (RHU), the next 4 bits of word 801 indicates the lowest 4 order bits of the channel number of the CPU 214a, 214b which has issued the load/dump order itself. The remaining high order bits of the CPU's channel number are always 0s, and therefore only the bottom 4 bits are provided. The next 6 bits of word 801 indicates one of 64 possible interrupt levels that the CPU is to utilize when the interrupt is received by it.

Word 802 specifies one of currently only three possible functions which can be performed. It specifies whether the operation is to be a storing or transfer of the contents of the LAC RAM 202 to the main memory 215 in the CPU, or it is to be the other way around where the LAC and RAM are loaded from the DPS6 memory. A third operation is the storing of configuration information into the DPS6 memory which is obtained from the LAC RAM.

Address words 803 and 804 store the high and low order address portions of the Level 6 memory address into which and from which the data is to be transferred.

Extent of Transfer Work 805 is the extend of the transfer which defines in terms of number of bytes the information that is transferred between the LAC and main memory.

LAC RAM address words 806 and 807 indicate the high and low order poriton of the address in the LAC RAM 202 into which or from which the data is to be moved. In the case of the Read Configuration type of information, that particular address is implied by the fact that configuration information is indicated. RSU word 808 is reserved for possible software use that becomes necessary.

Status word 809 represents the status regarding information that has been delivered to the CPU upon completion of the transfer operation. The operation will terminate if there is a problem and the status will be indicated in the Status word 809. However if there is no problem in the transfer, the Status Word will contain all 0s. If there is a problem, the 8 high order bits of Status Word 809 must still be all 0s. The next bit, which is the invalid function bit, is used to indicate that the request is somehow or other invalid and that perhaps the load/dump function code that was used is not a defined code. For example, the next bit is Memory Exhaust MEMEXH and indicates that more than one load/dump function was issued—one right after another and therefore the controller could not handle them all, since it can handle one such function at a time. The next time RAMNE of word 809 is the RAM Non-Existent bit which indicates that the address defined in words 806, 807 point to a section of non-existent memory in the LAC RAM. Accordingly this bit indicates that the transfer was not completed because of this difficulty. The next bit RAMP indicates that during the process of reading out LAC RAM 202 to transfer that information to the CPU memory 215, there was a parity error. The MY bit of Status Work 809 stands for Memory Yellow and indicates that during a transfer of information from Level 6 to the LAC RAM an error occurred in the data readout, but the error was correctible and therefore the data has been delivered to the LAC. This indicates a warning that there is something weak in the Level 6 memory. The next bit NEM is an acronym for non-existent Level 6 memory and indicates that by utilizing the address formed by words 803, 804 that a piece of non-existent Level 6 memory 215 was being addressed. The L6B bit indicates a Level 6 bus parity error occurred during transfer of information from Level 6 memory to the LAC, and that the error occurred somewhere along the Level 6 Megabus 216 and that the data placed into the LAC RAM 202 has an error within it. The last bit MR of word 809 is an acronym for Memory Red and indicates that in the transfer of Level 6 memory to the LAC memory that the information read out the Level 6 memory was incorrect and could not be corrected with a correction hardware, and therefore the information delivered to the LAC RAM is incorrect. MBZ word 810 is a word which must have all 0s in it and is for future use. Finally completion word 811 has a status complete bit SC which is set by the LAC controller upon completion of the operation and is used to indicate to the Level 6 software that whatever status is in word 809 represents the complete status of the operation.

Figure 9:
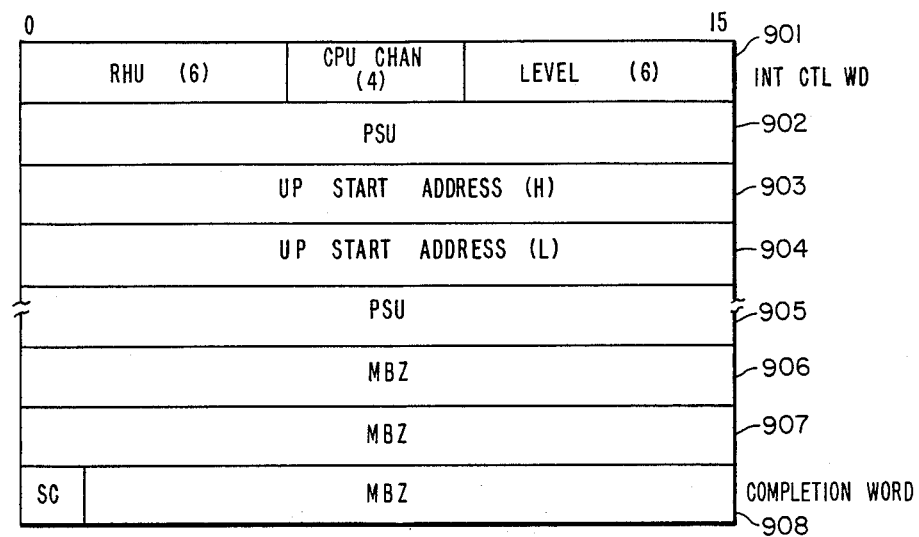
FIG. 9 is a schematic diagram of a LAN control block for the start I/O order.

Referring now to FIG. 9, there is shown another LAN Control Block format for the start I/O order which has previously been described. Word 901 is a 16-bit word in which the 6 high order bits are again reserved for hardware use (RSU), and normally is all 0s. The next 4 bits identify the CPU channel and designate the bottom 4 bits of the channel number of a CPU issuing the order and also is the channel number which is interrupted when the start I/O is complete. The level number of word 901 is the bottom 6 bits and indicates one of 64 interrupt levels in the CPU which are activated when the operation is complete.

The RSU word 902 is a spare area for software use for any purpose that becomes necessary. Words 903, 904 represent the microprocessor start address at which the microprocessor 201 is to start executing a particular program. Generally before the microprocessor is started, the microprocessor's memory 202 will have been loaded by a load operation previously described in connection with FIG. 8, and accordingly the purpose of the present order is to tell the microprocessor where to start executing the code that has been loaded. The RSU word 905 is another word reserved for software future use. MBZ words 906, 907 are two words that must contain all 0s. The MBZ word 908 has a status complete bit (SC) which is loaded by the microprocessor 201 when it has finished the start operation and indicates to the central processor when it is interrupted that the start I/O order has been completed correctly. The remainder of the MBZ word 908 is all 0s.

Figure 10:
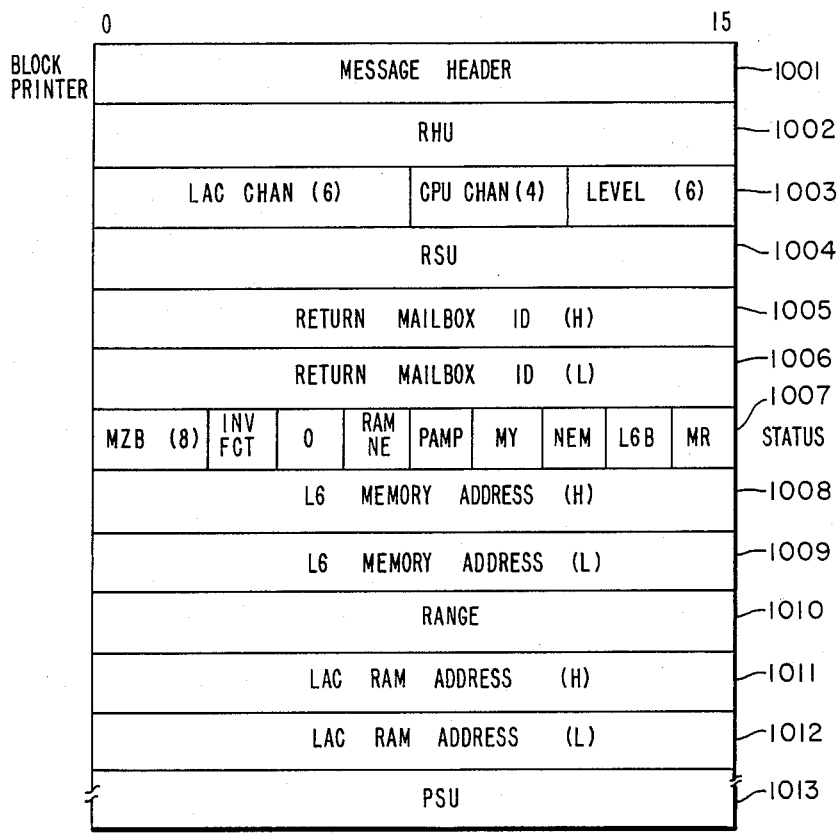
FIG. 10 is a schematic diagram of a typical mailbox that is utilized for requesting a DMA operation to move a block of data.

Referring now to FIG. 10, there is shown a typical mailbox message that is utilized for requesting a DMA operation to move a block of data, such as the LAN Control Blocks previously described, between memory located in the LAC and memory located in the Level 6; i.e., from RAM 202 to RAM 215. The message header 1001 usually contains a type code which defines exactly what kind of a transfer is being requested; i.e., a block transfer such as LAN Control Block, etc. Generally the message header is comprised of several words of information, although FIG. 10 shows it as if it is comprised of only one word. The RHU word 1002 is reserved for hardware use and is extra spare space for future use. Upon the completion of an operation, such as a block transfer, the CPU requesting such transfer may need to be interrupted and informed of what has happened. Word 1003 specifies the parameters that are to be used when such an interrupt is needed. However an interrupt can only be sent if the level which is comprised of the bottom 6 bits of word 1003 is not all 0s. The LAC channel number is comprised of the 6 high order bits of word 1003 and is used on the interrupt for the spcific channel which was originally addressed by the order which the CPU had given to the LAC. The CPU channel number of word 1003 is essentially the same as that on FIGS. 8 and 9 and is a 4 bit word defining the channel number of the CPU that is to be interrupted. Finally the level word is a 6 bit word which defines the level of the interrupt. The return mailbox ID words 1005 and 106 identify the mailbox 202a within a LAC which has actually asked for the operation to be performed and therefore represents the process to be notified when the operation itself is completed. Status word 1007 is returned by the memory DMA process when the operation terminates. The definition of the bits are similar to the status word 809 of FIG. 8. The Level 6 memory address words 1008 and 1009 define the high and low order portions of the Level 6 memory address into which or from which the transfer is to occur. The range word 1010 defines how many words/bytes are to be transferred in the operation. The LAC RAM address words 1011 and 1012 define the address within the RAM of the LAC where the information is to be obtained from or delivered to.

The RSU word 1013 is reserved for hardware future use.

Figure 11:
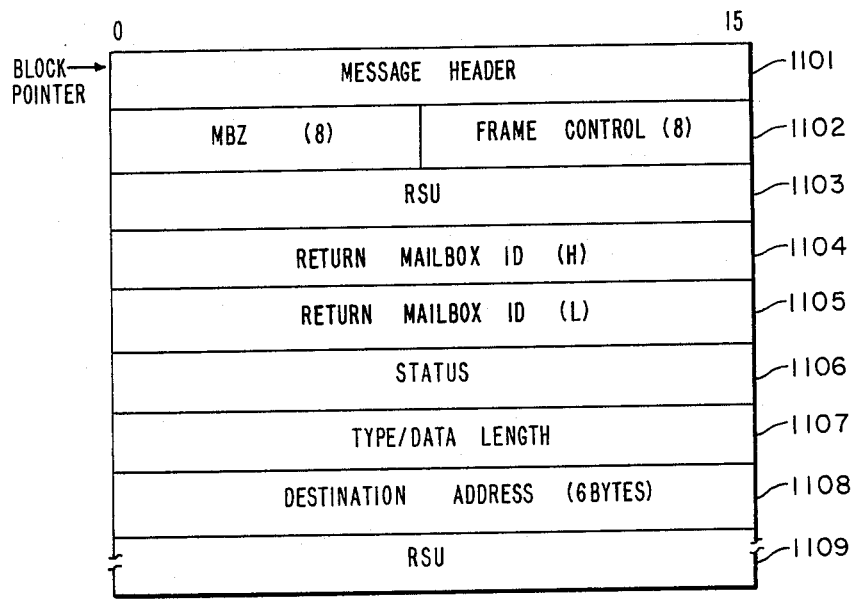
FIG. 11 is a schematic diagram of a hardware format for transmitting messages.

Referring now to FIG. 11, there is shown a mailbox message which is sent to an adapter interface software process as a typical data transmit request for transmitting a message on the LAN. This accommodates different types of LANs having IEEE Standards Committee interfaces. The message header 1101 contains several bits of information, such as a type code which defines the nature of the message to be transmitted, a buffer address descriptor which defines where the data that is to be sent out over the local area network is located in the RAM 202. Frame control word 1102 comprised of the 8 low order bits is utilized to indicate the frame type in token bus or token ring type frames. The RSU word 1103 is an area reserved for software use. Return mailbox ID words 1104, 1105 identify the mailbox of the process which is asked for the transmit/transfer to be done, so that a message is deposited in the mailbox so that the process may be identified when the operation is completed.

Status word 1106 is defined basically by whatever the software determines it wants to return. Type/data length word 1107 is used in CSMA/CD and Ethernet frames. In the case where an Ethernet type LAN is coupled to the LAC, it indicates the length of the frame; whereas if a CSMA/CD type LAN is coupled to the LAC, it indicates the IEEE 802.3 frame type being used. The destination address word 1108 defines the station address to which a message is to be sent. Finally the RSU word 1109 is an area reserved for software use.

Figure 12:
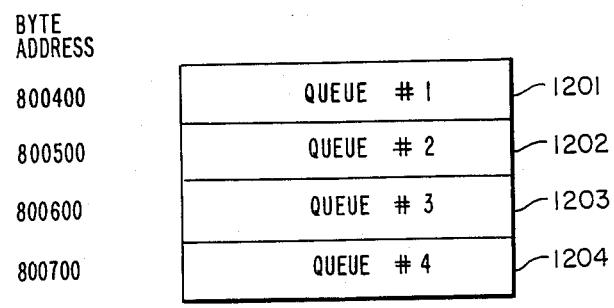
FIGS. 12 and 13 show temporary queues in the RAM.
Figure 13:
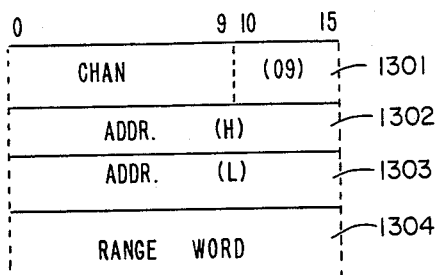

Referring now to FIGS. 12 and 13, there is shown the location and layout of the RAM memory area assigned as the I/O order temporary queue. FIG. 12 shows different queues, numbered 1201–1204 lcoated at byte addresses 800400–800700. FIG. 13 shows a typical entry in any of the queues. Word 1301 shows the channel number that is being temporarily stored; whereas address words 1301, 1303 show the high and low order addresses of the information to be transferred in main memory. The range word 1304 indicates the number of bytes in the information that is to be transferred.

INTERFACE (IF) SOFTWARE

FIGS. 14 through 18 are a set of flowcharts that show in greater detail the high level functional responsibilities of the various IF software processes and interrupt routines.

Figure 14:
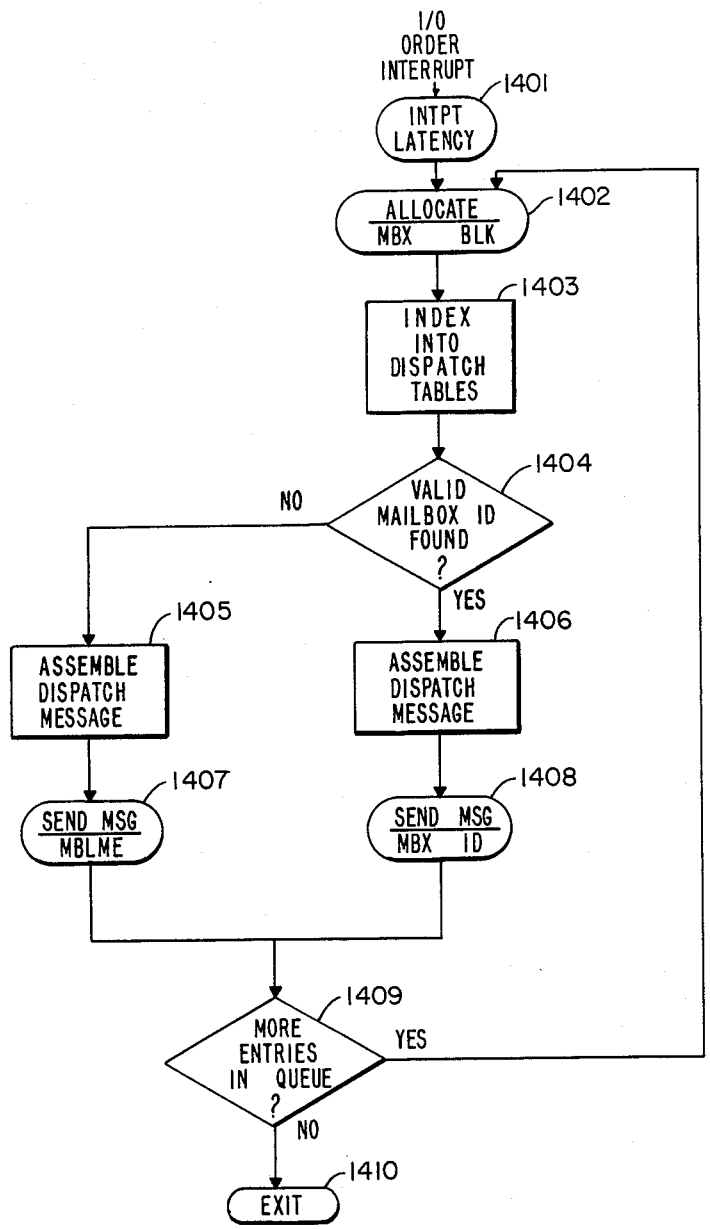
FIG. 14 is a flow diagram of the I/O dispatch process in the LAC controller.

Referring now to FIG. 14, there is shown the flow diagram of the operations performed by the I/O dispatch process in the LAC controller. The Interrupt Latency 1401 represents the amount of microprocessor time before an I/O order interrupt can be serviced by this routine. Whenever an I/O order is received by the LAC controller, there is a finite of time for the microprocessor 201 to react to it and switch operations so that is can handle the interrupt. ALLOCATE MBX blk 1402 is a call to the Kernel software of the LAC controller to allocate a message block so that the I/O dispatch process can notify some other process within the LAC controller about the IOLD order that has just been received. The actual operations that are peformed by the dispatch process are defined by the Index into Dispatch Tables 1403. The dispatch tables are indexed by means of the channel number to which the I/O order is addressed, as well as the function code which is part of the I/O order and has been discussed supra. Accordingly the dispatch process will index utilizing the dispatch tables in order to find out what process is to be notified. If there is no process to be notified, then the instruction is dispatched to a Megabus layer management by assembling a dispatch message 1405 and sending that message in the next step SENDMSG 1407. The I/O order is then sent to a layer management process which has the responsibility of deciding what to do with it. Assuming a Valid Mailbox ID is found 1404, the process then assembles a Assemble Dispatch Message 1406 which contains the IOLD information and the message is sent via SENDMSG 1408 to the particular process identified in order that it may handle it. In the normal case of a DMA message, it would normally be sent to either the transport/transmit process or the transport/receive process depending on whether it an I/O order for an input or an output operation. If there are any more orders that have been received while this process has been running as there are entries in the queue 1409, then the dispatch process will loop back to ALLOCATE MBX blk 1402 and repeat the process for the next order. If there are no more entries in the queue 1409, then the dispatch process exits at 1410.

Figure 15:
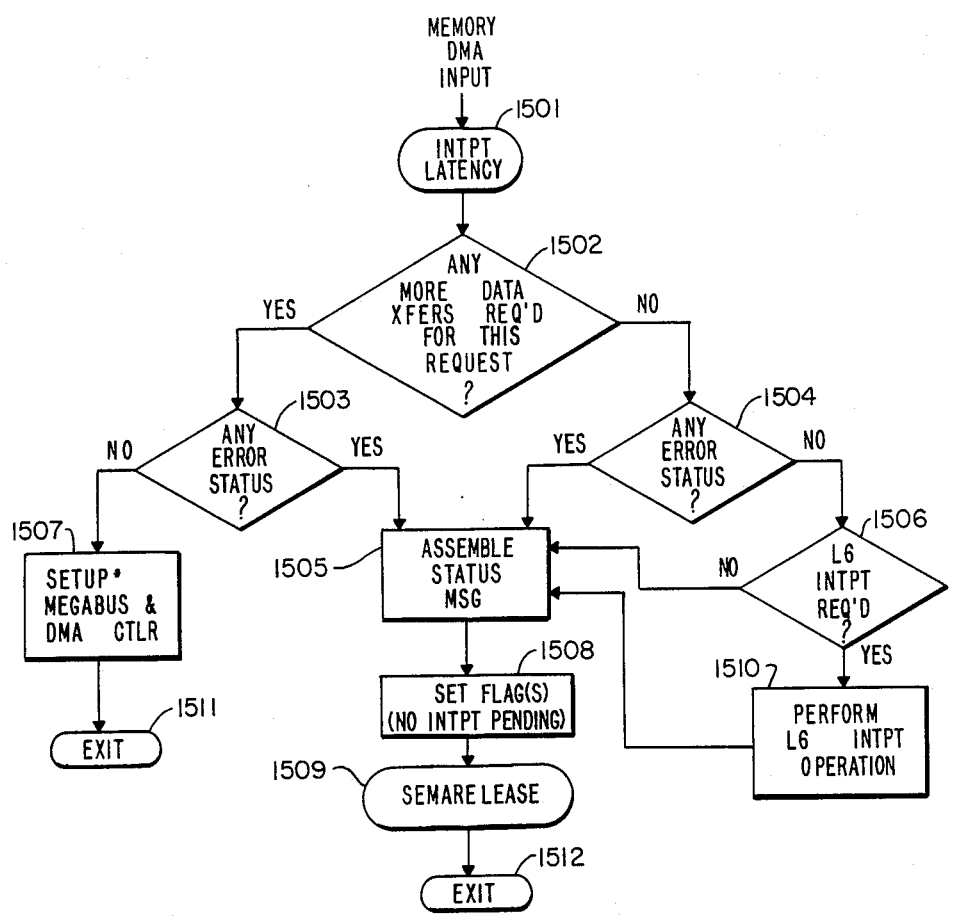
FIGS. 15 and 16 show the flow diagrams of the DMA process on the LAC controller.
Figure 16:
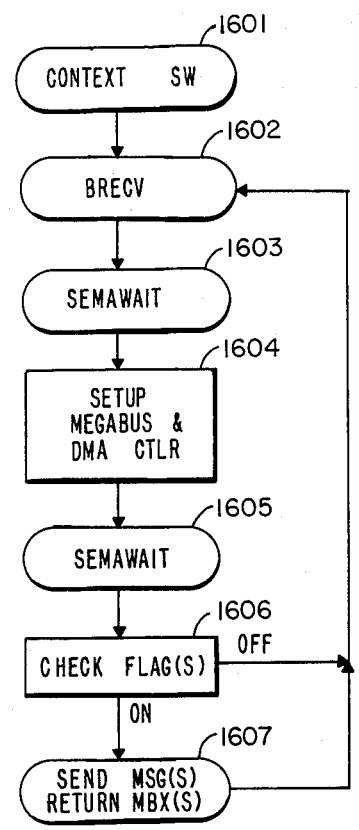

Referring now to FIGS. 15 and 16 there is shown the flow diagram of the DMA process that runs on the LAC controller. There actually two parts to this process. One part is shown on FIG. 15 which is that portion of the memory DMA process that runs upon an interrupt upon completion of a DMA operation. The other part of the process shown in FIG. 16 depends on whether or not the mailbox 202a has received any request.

Referring first to FIG. 16, the operation beings when a request for a memory DMA operation is received from one of the processes in the LAC controller. In order for this process to start running, it is necesary to first swap CONTEXT SW 1601. A Kernel software call BRECV 1602 is then made to determine whethter there is any request in its incoming mailbox. If there is a no request for the process to perform some operation, then the process stalls and will not proceed any further than the BRECV instruction 1602. If there is a request for some operation, a semaphore check SEMAWAIT 1603 is made by a call to the O. S. Kernel which maintains all semaphores, for the interrupt process to ascertain that the interrupt process is not already performing some other operation regarding the DMA controller; i.e., there is already a DMA operation underway. If there is no current DMA operation underway, then the process will proceed to step 1604 where it loads the Megabus registers and the DMA controller with the necessary information to perform a DMA transfer. Having completed this loading operation, the process then sets a semaphore bit SEMAWAIT 1605 (by means of a call to the O. S. Kernel) of the semaphore previously checked in setup 1603 so that no further DMA operations will be performed while the semaphore bit is set. In Step 1606 a flag(s) is checked to see if any interrupts required for completed operations are still awaiting acceptance by the CPU (i.e. "pending"); if not pending, a return mailbox message is sent to the process which requested the operation. In SENDMESG RETURN MBX step 1607 a return message(s) is sent for the DMA operations(s) that have been completed. (It is not a return for the particular DMA operation which is just being started.) The software then loops back to BRECV 1602 and stalls if there is a no request for it to perform some operation. If there is another request waiting, it will stall on SEMAWAIT 1603, which is the semaphore which was just set in step 1605 when the operation started. When the particular DMA operation is completed, the process flow then switches to FIG. 15. Once again there is an Interrupt Latency 1501 before the interrupt is recognized and begins running. Once the process takes over, a test 1502 is made to determine whether the process can handle scatter/gather type data transfers between the Level 6 and the LAC controller. If this is a scatter/gather type operation, then the operation proceeds through steps 1503, 1507 and 1511 where the DMA controller has set up so the process can continue with the scatter/gather operation of the additional transfers that are necessary. If there is only one transfer to be made, because there is no scatter/gather type data transfers, then the process proceeds to Error Check 1504 to determine if there has been any errors, such as parity errors or non-existent memory. If there have been any errors, a status message 1505 would be assembled regarding the type of error that has occurred. A flag is set 1508 to indicate that a message can be returned to the requesting process (this flag is the same flag that is referenced in step 1606). The semaphore which was referenced in step 1603 is now released in step 1509 so that the second portion of the process can run and handle the next operation and exit on step 1512. If there are no errors in step 1504, a check is made in step 1506 to determine whether or not the Level 6 should be interrupted upon completion of the operation. (This is determined by having a Level code in the DMA request, previously mentioned, which indicates that there is a request for an interrupt.) If there are no errors, then the interrupt to the Level 6 will be performed (or attempted) on step 1510 in order to indicate to the Level 6 system that a DMA operation has been finished without error. If there has been an error in the operation, the interrupt is not attempted. Instead a status message 1505 is sent back to the requesting process to indicate to it that there has been an error in the operation.

Figure 17:
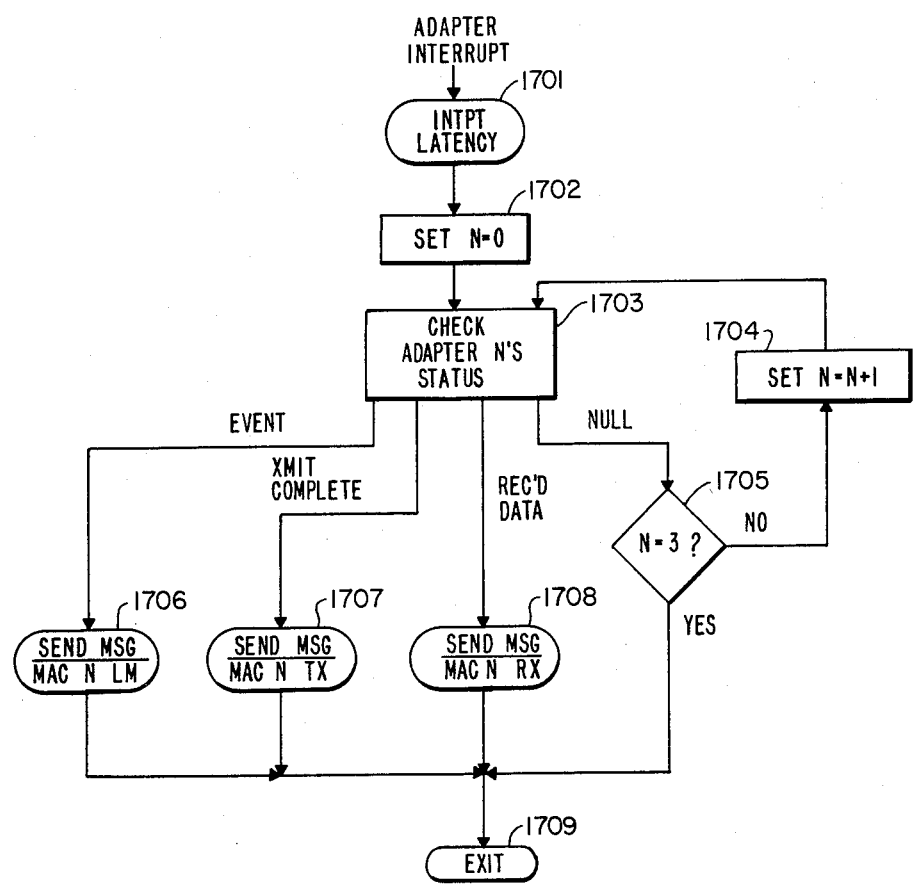
FIG. 17 is the flow diagram of the adapter interrupt routine for interrupting the LAC controller.

Referring now to FIG. 17, there is shown a flow diagram of the adapter interrupt routine for interrupting the LAC controller. It is activated by the LAC controller when one of the adapters 216–219 has sent an interrupt to the LAC controller indicating that it has completed some operation or that something unusual has happened and wants to notify some software process regarding this matter. Accordingly in the loop comprised of steps 1701, 1702, 1703, 1705, and 1704, there is a loop where the interrupt software determines which of the adapters is doing the interrupt. Since the interrupts from all 4 possible adapters are tied together on a single wire, the software has to query each adapter as to whether or not it is the adapter asking for an interrupt. Accordingly the loop shows a testing of each adapter in turn and trying to determine which adapter requested the interrupt. When it determines the particular adapter(s) that has made the interrupt, then the interrupt routine branches to steps 1706, 1707, 1708 and composes a message(s) which depends upon the reason for the interrupt(s). In SENDMSG MAC N TX 1707 a message is sent from an adapter which has just finished a transmission request that it had been requested to do. SENDMSG MAC N RX 1708 represents the fact that an adapter has received an incoming message from the LAN and therefore the adapter wishes to send a mailbox message to handle the particular situation. SENDMSG MAC N LM 1706 represents an event occurrence and the sending of a mailbox message to a MAC layer management process to handle the event. Finally after completion of sending a message, the interrupt routine exits at step 1709.

Figure 18:
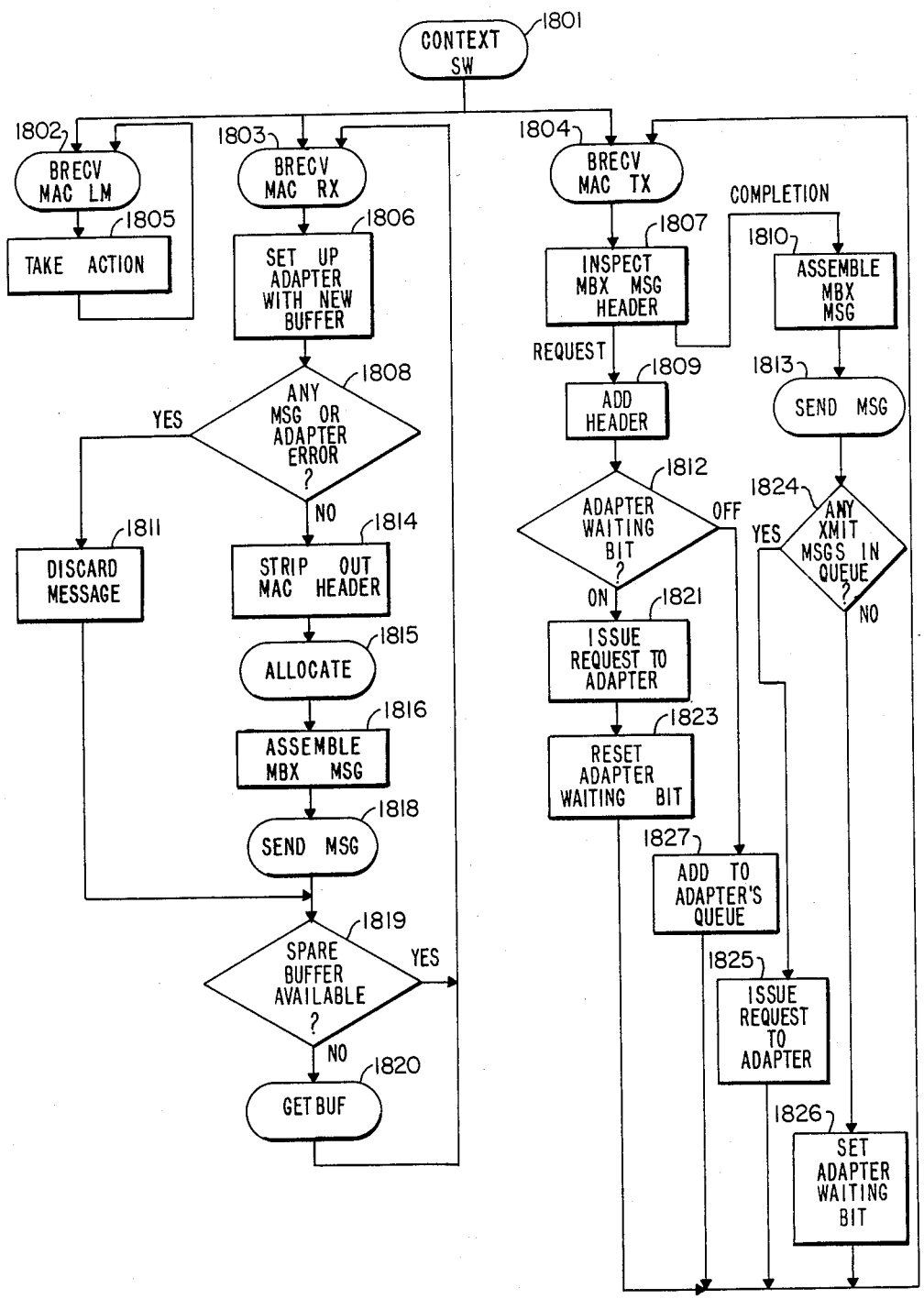
FIG. 18 is a flow diagram for three different MAC processes of an adapter.

Referring now to FIG. 18 there is shown some adapter-specific MAC processes and represents the flow of three different MAC processes for a particular adapter. The process is initiated once again via a context switch 1801 which receives all mailbox messages or switches context to receive it. One of the processes BRECV MAC LM 1802, BRECV MAC RX 1803 or BRECV MAC TX 1804 will be activated when it receives a mailbox message in its mailbox from the adapter interrupt process shown on FIG. 17. Only one of these processes will be activated upon receipt of a message. The MAC layer management 1802, 1805, when activated, would take some action depending on the circumstances, such as notifying the station management process by sending it a message or it might simply reset the adapter itself. When a message is received BRECV MAC RX 1803, the process replaces the buffers 1806 that the MAC adapter has used up in handling the message. The MAC adapter has a predetermined number of buffers available for placing data therein, and those which have been used for incoming message must be replaced in order that the adapter can be ready for further messages. Once this is accomplished, the process determines whether or not there are any errors in the message or in the adapter 1808. If there are errors, the message is discarded 1811. If there are no errors, then the process strips out the MAC header 1814 in preparation for sending this message to the logical link control layer software process for further handling. (it is one of the CS software processes in 301). In the AL-LOCATE step 1815 a block of memory is allocated for the purposes of setting up a mailbox message. Then the message is assembled in step 1816 and sent to the logical link control process on step 1818. In steps 1819 and 1820 the MAC process obtains spare buffer(s), if necessary, in anticipation of possible future need of replacement buffers for the adapter.

If a transmit operation had been performed, a message is received by BRECV MAC TX 1804 indicating completion of the transmit operation. The message is inspected in order to decide what type of message it is; i.e., whether the message has been received from the adapter interrupt routine indicating completion or whether the message has been received from the Link Layer Control (LLC) requesting it to transmit. Assuming that the message is one of completion, a completion return message is assembled in step 1810 and is sent to the LLC in step 1813. Once this has been done, the process then determines whether or not there are more messages to transmit in its queue 1824. If there are additional mesages, then the process proceeds to step 1825 where the request is issued to the adapter so that it can transmit the message that is waiting. If it is determined in step 1824 that there are no messages waiting in the queue, an adapter waiting bit is set 1826 which indicates simply that the adapter is no longer busy doing anything and there is a loop-back to the receive mailbox of BRECV MAC TX 1804. On the other hand, if a request is received from the LLC for a transmit, then the necessary headers that define the source address of the MAC that will do the transmission are added in step 1809 and the adapter waiting bit is checked in step 1812 to determine whether or not the request came in while the adapter was doing nothing at all. In the event the adapter was waiting for something to do, the process would proceed to step 1821 and immediately send the transmit request to the adapter and reset the adapter waiting bit 1823, indicating that the adapter is now busy. On the other hand, if it is determined in step 1812 that the request came in when the adapter was already busy doing something, then the request is added to the adapter's queue 1827.

Figure 19:
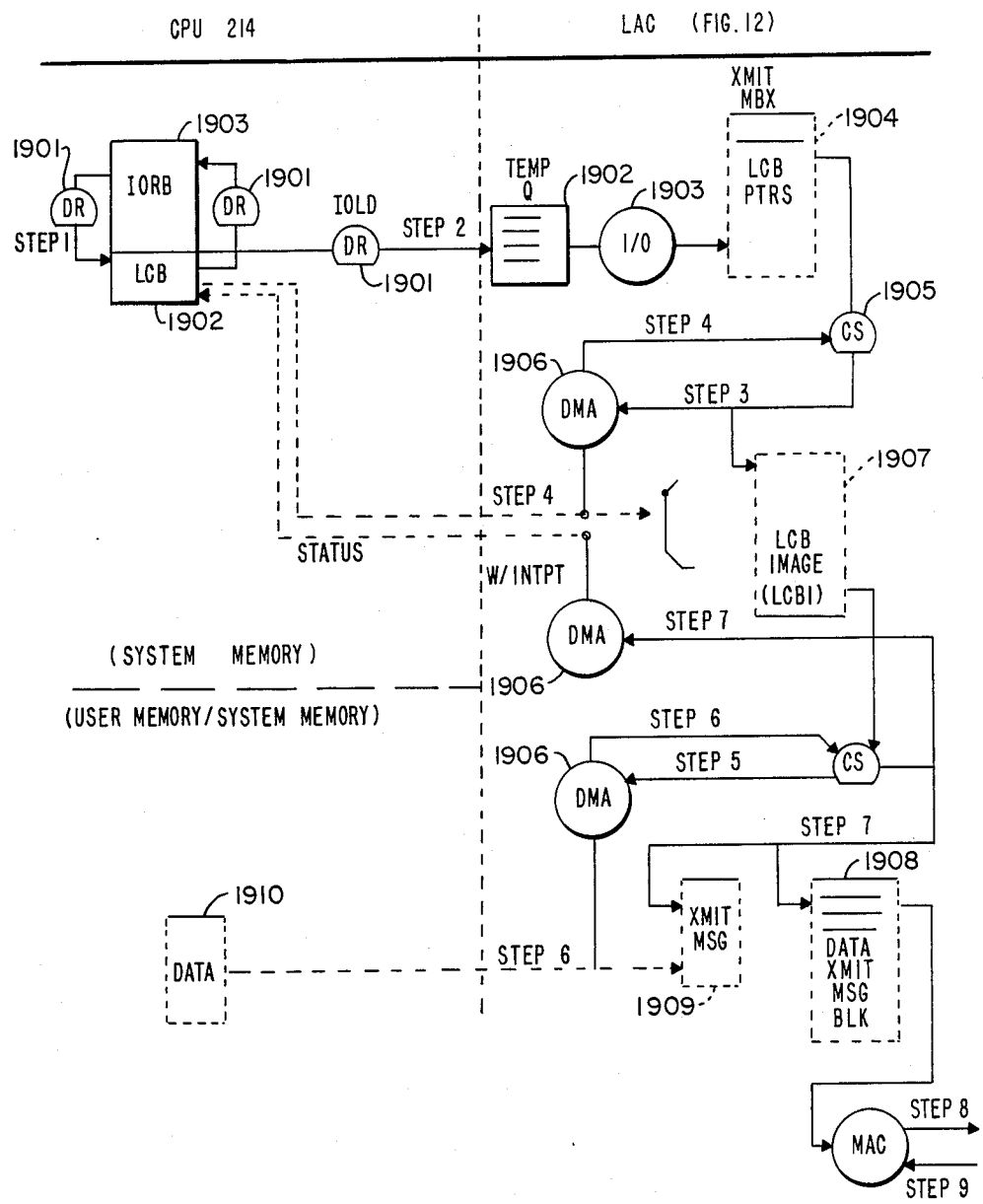
FIG. 19 is a schematic diagram of the LAC transmit flow of a LAN control block.

Referring now to FIG. 19, there is shown the LAC transmit flow. In Step 1, the LACS Driver software in the CPU 214*a/b* sets up the LCB 1902 in memory from information in the IORB 1903. The LCB will contain information defining the processing and function required and parameters; it also contains physical address(es) and range(s) defining the buffer(s) in memory which contain the data to be sent. The LCB also includes space for return status from the LAC.

In Step 2, the LAC Driver 1901 issues an Input/Output Load Order (IOLD) to the LACS. The address given with the order points to the LCB and the "Range" parameter contains two fields: the high order 8 bits are a Function Code field and the low order 8 bits define the size of the LCB. The IOLD information is taken off the Megabus 216 and placed in a temporary queue 1902 by the LAC hardware DMA controller. This causes an interrupt which invokes the I/O Dispatch process (IODISP) which inspects the order; having determined that the IOLD is valid, it uses the channel number in the order to reference a Dispatch table and determine where to route the order for further processing. In this case, the routine obtains a block of RAM (via an ALLOCATE call), places the LCB pointer IOLD information in the block, and sends it (via a SENDMSG call) to a CS process mailbox. The format of the LCB Pointer IOLD information message block has been previously discussed. If there are additional I/O orders in the queue, the I/O Dispatch process will handle these also. All message blocks obtained by the I/O Dispatch process must be returned to free memory by some other process (e.g. in Step 12).

In Step 3, a CS process 1905 is scheduled for execution by the OS (because of the mailbox message addressed to it); process retrieves the mailbox message and, after securing a block of RAM for an LCB image (LCBI) 1907 sends a message to the mailbox of the Memory DMA Request process 1906 requesting DMA of the LCB into this LCBI. The CS process 1905 may then suspend itself if it has nothing else to do for the moment.

In Step 4, the Memory DMA Request process 1906 causes the DMA controller to copy the LCB 1902 into the LCBI 1907. On completion of the operation, the DMA controller interrupts the microprocessor 201 and this causes the Memory DMA process to be re-invoked. This process places status information, in the message block which was sent by the CS process and then returns the block (via a SENDMSG call) to the specified return mailbox. Information originally placed in the RSU field of the block by the CS process in Step 3 allows it to identify the particular DMA operation which has been completed.

In Step 5, the CS process responds to the mailbox message of Step 4. After inspecting the LCBI and calculating the total of the L6 buffer ranges, it performs a GETBUF call to obtain a RAM buffer big enough to hold the data message; then it sends a mailbox message to the Memory DMA process to cause the movement of data from main memory to this buffer in RAM. The format of typical message blocks are shown in FIGS. 10 and 11; the LB buffer list is obtained from the LCBI 1907 and the LEVEL field should be zero.

In Step 6, the Memory DMA process causes the DMA controller 208 to copy the data from main memory to the RAM buffer 209. The process will support a "gather" type DMA with respect to main memory, if required; with respect to the LAC RAM, DMA is always done on a logically single buffer. On completion of the DMA, the Memory DMA process is reinvoked and places status in the message block and returns it to the specified return mailbox (of the CS process).

In Step 7, the CS process responds to the mailbox message of Step 6. It sends a mailbox message to the Memory DMA process 1906 to cause it to set status complete in the LCB 1902 in memory and to interrupt the CPU 214*a/b*. At some later time the LACS driver will post the completion into the IORB 1903. If a message is to be sent over an IEEE 802 type LAN, CS processes must create header fields and add this as prefix information to the RAM buffer 209. CS processes must also have left additional space at the beginning of the buffer for the MAC process to prefix its headers. A CS LLC process assembles a mailbox message 1908 and sends it 1909 to the appropriate MAC process.

In Step 8, the MAC Transmit process may queue the request if there are higher priority requests to be handled. As soon as it can, the process delivers the request to the adapters 216–219. The adapter completes prefixing of the message frame (SA and FC), and when media access rules permit, delivers a correctly formatted frame (including preamble, delimiters and FCS) to the LAN via the adapter's PHYS layer facilities. When transmission is complete, the adapter's DMA controller sends an interrupt to the microprocessor 201 of the LAC.

In Step 9, the Adapter Interupt routine invokes a MAC transmit Process which fetches final status from the adapter. The MAC Transmit process releases the RAM buffer (FREEBUF call). If there are other transmit requests pending the process will deliver one to the adapter.

In FIG. 19 although the transmit flow just described, presents a single thread of flow for clarity, there are actually multiple threads being processed at various stages at any instant of time. Since each software process is written to try to complete all of its outstanding tasks, if possible, before voluntarily relinquishing the microprocessor, the number of context switches performed per message transmitted will tend to be less under typical load than when considering only a single message thread.

For handling received messages, one of two schemes can be used depending on whether the application wishes to allocate a buffer only if and when a message is received from the LAN or whether it wishes to allocate a buffer in anticipation of a possible incoming message. In the first or Read-Notify case, two IOLDs must be issued and two interrupts must be sent to the CPU for each message. In the second case, main memory space requirements tend to be greater because of the buffers which are tied up waiting for a message.

The description of receive flow will not be given in as much detail as in the transmit case since the interactions of CS software processes, IF software processes, hardware interrupts, and interrupt firmware are similar.

For receive operation it is not necessary for CS software to request data buffers from memory management, as is the case for transmit operation. Instead, the IF Software MAC processes will automatically make available several logical buffers for each adapter, each of which is of sufficient size to hold the largest possible message. After a valid message is received, the Data Indicate routine of the MAC process will pass the buffer to the proper CS process.

Figure 20:
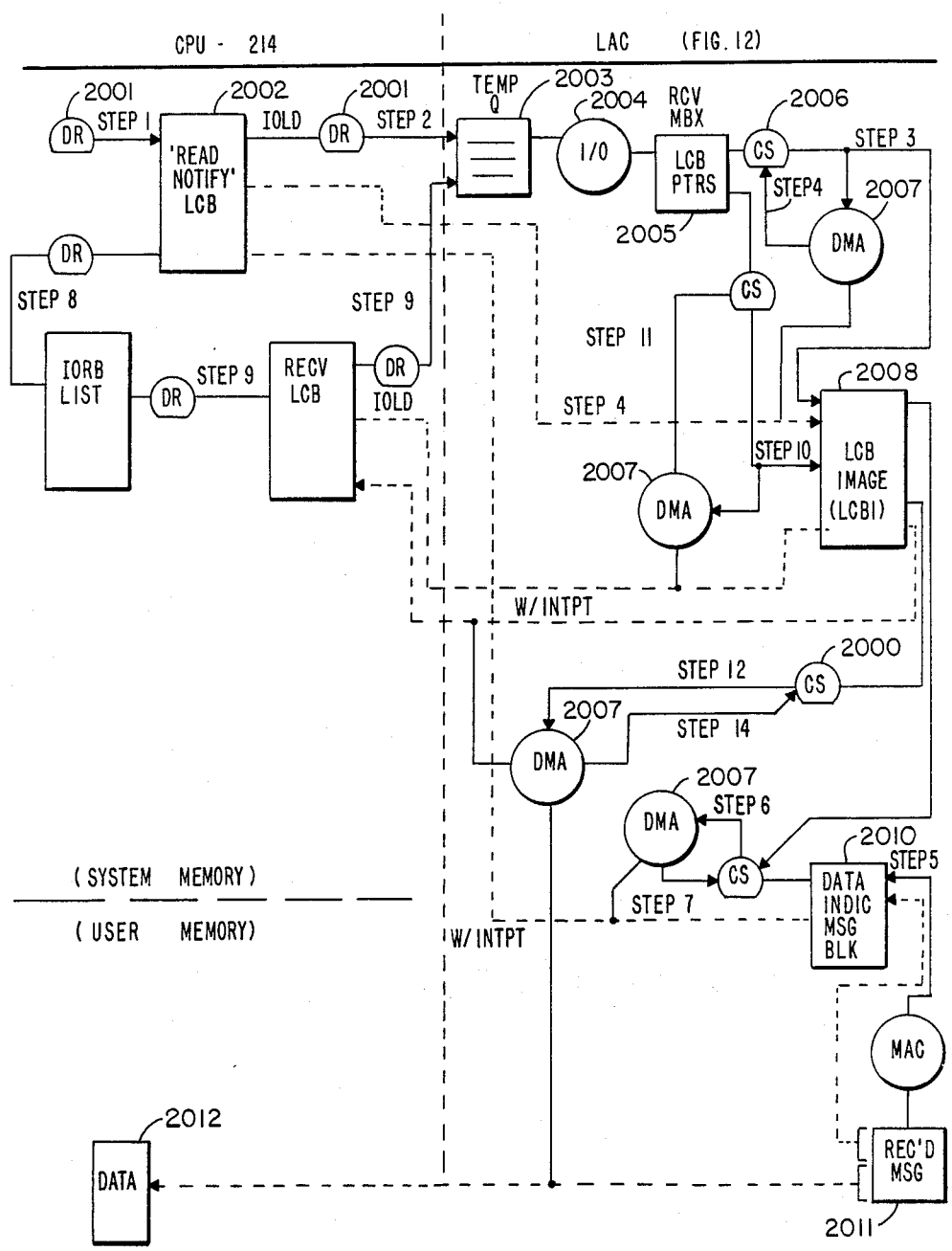
FIG. 20 is a schematic diagram of the LAC receive flow of a LAN control block.

In the Read-Notify case, shown in FIG. 20, CPU software issues a series of LBCs, which are called "Read-Notify" LCBs 2002, to the LAC via Output LCB Pointer IOLD orders. These serve to provide LCBs which the CS software may use for notifying CPU software of the arrival of messages. When the arrival of a message has been indicated by this means, the CPU software will issue a READ LCB to specify where, in main memory, the message is to be placed and will also, in general, issue another Read-Notify LCB to replace the one which was used. This scheme allows the data to be input directly to the application's buffer. Read LCBs are differentiated from Read-Notify LCBs by some software-defined indication in the LCB itself.

In Step 6, a CS process 2006 consults its list of Read-Notify LCBs to see if there is one which pertains to the particular message just received. If there is none, the message is retained in RAM (however if some reasonable time passes without an appropriate LCB the process may be forced to discard the message). In the usual case, a CS process assembles information from the message header 1001 to be delivered to the LCB in memory 215, assembles a mailbox message block, and sends it to the Memory DMA process 2007 requesting DMA of this information into the Read-Notify LCB 2002. In the message block, the CPU Channel and Interrupt LEVEL fields reflect information given in the original IOLD and LCB as does the channel number. (see FIG. 8)

In Step 7, the DMA controller 2007 delivers the information to the Read-Notify LCB 2002 and interrupts the microprocessor 201, causing it to re-invoke the Memory DMA process 2007. This process now sends the requested interrupt to the CPU and when this has been accomplished returns the message block of Step 6 to the return mailbox (the CS process).

In Step 8, CPU software responds to the interrupt and, by consulting a list of outstanding IORBs or by other means, determines where in main memory the data message should be placed. The LACS Driver 2001 then sets up a Read LCB in memory. This LCB will contain the identifier of Step 6 (so that the CS process in the LAC can identify which data message is to be delivered) and specifies the main memory area(s) into which it is to be placed.

In Step 9, the LACS Driver 2001 issues an IOLD to the LACS pointing to the LCB. In the usual manner, the IF Software delivers the LCB Pointer Information 2005 to the CS process 2006.

In Step 10, the CS process issues a request for the Memory DMA process to copy the LCB into a LCBI 2008 in RAM.

In Step 12, the CS process inspects the LCBI and determines that a Read operation is involved. The process calculates the total size of the L6 buffer and calculates a Range Residue value for LCB status and places final status in the LCBI 2008; it then issues a request to the Memory DMA process to move the data message from RAM 209 to main memory 215 and to deliver final status from the LCBI to the LCB and to interrupt the CPU.

In Step 13, the DMA Controller copies the data 2012 from buffer RAM to main memory, performing a "scatter" DMA if required, under control of the DMA process. On successful completion of the data transfer the DMA process performs a Block transfer which copies the LCBI status into the LCB and interrupts the CPU. On completion of this the Memory DMA process return the mailbox message block to the return mailbox (the CS process).

In Step 14, the CS process may release the data buffer, the LCBI block and the mailbox message block.

Again although the description and Figure present a single thread of flow for clarity, there are actually multiple threads being processed at various stages at any instant of time. Because each software process is written so as to try to complete all its outstanding tasks before relinquishing the microprocessor, the number of context switches performed per message received will be less under typical load than when considering only a single message thread.

In the Read LCB case, not shown in a Figure, the CPU issues IOLDs, which point to Read LCBs, each Read LCB includes pointer(s) to buffer(s) in system memory large enough to hold the largest possible message. Only one interrupt need be sent to the CPU, i.e., after the data and final status have been delivered.

Having shown and described one embodiment of the invention, those skilled in the art will realize that many variations and modifications can be made to produce the described invention and still be within the spirit and scope of the claimed invention. It is the intent therefore, that the invention be limited only as indicated by the scope of the claims.

| | ABBREVIATIONS/DEFINITIONS |
|---|---|
| ACK | Positive Acknowledgement |
| CM | Controller Management (Software) |
| CRC | Cyclic Redundancy Check |
| CPU | Central Processing Unit |
| CS | Communication Service (Software) |
| CSMA/CD | Carrier Sense Multiple Access/Collision Detect |
| DMA | Direct Memory Access |
| DA | Destination Address |
| DRAM | Dynamic RAM |
| DSAP | Destination Service Access Point |
| EPROM | Erasable Programmable Read Only Memory |
| FC | Function Code/Frame Control |
| FIFO | First-In-First-Out |
| GA | Group Address |
| GETBUF | Get Buffer |
| ICW | Interrupt Control Word |
| IODISP | IO Dispatch |
| IORB | Input/Output Request Block |
| ID | Identification |
| IF | Interface (Software) |
| I/O | Input/Output |
| IOLD | Input/Output Load |
| LAC | Local Area Controller |
| LACS | Local Area Controller Subsystem |
| LAN | Local Area Network |
| LCB | LAN Control Block |
| LCBI | LAN Control Block Image |
| LLC | Link Layer Control |
| LME | Layer Management Entity |
| LMI | Layer Management Interface |
| LSAP | Link Services Access Point |
| LSI | Large Scale Integration |
| MAC | Media Access Controller |
| MBLME | Megabus Layer Management Entity |
| MBZ | Must be Zero |
| MEMDMA | Memory Direct Memory Access |
| MSB | Most Significant Byte |
| MSB | Most Significant Bit |
| MTBF | Mean Time Between Failures |

ABBREVIATIONS/DEFINITIONS -continued

| | |
|---|---|
| MTTR | Mean Time To Repair |
| NAK | Negative Acknowledgement |
| ORU | Optimum Replaceable Unit |
| OS | Operating System/Open System |
| OSI | Open Systems Interconnection |
| PAL | Programmable Array Logic |
| PC | Personal Computer |
| PIO | Physical Input/Output |
| PROM | Programmable Read-Only Memory |
| PDU | Protocol Data Unit |
| QLT | Quality Logic Test |
| RAM | Random Access Memory |
| RFU | Reserved for Future Use |
| RHU | Reserved for Hardware Use |
| RINT | Resume Interrupt |
| RSU | Reserved for Software Use |
| SA | Source Address/Station Address |
| SC | Status Complete/Service Call |
| SM | Systems Management (Software) |
| SMDSI | Systems Management Data Service Interface |
| SSAP | Source Service Accesss Point |
| TBD | To Be Defined |
| TC | Trunk Coupler |
| T & V | Test and Verification |
| WS | Work Station |

What is claimed is:

1. A local area network (LAN) system comprising:
    (a) a first bus being coupled to a first plurality of units, said first plurality of units including at least a first processor and a first random access memory (RAM), said first RAM for storing procedures for controlling said first processor, said first processor for executing the procedures stored in said first RAM;
    (b) a second bus being coupled to a second plurality of units which include at least a second RAM, a direct memory access controller (DMA), said second RAM having a first portion for storing user programs for execution on said first processor and a second portion used for simultaneous direct memory access of data to or from said second portion of said second RAM;
    (c) first means for coupling said first bus to said second bus for separating said first processor and said first RAM from said second processor and said second RAM while permitting the flow of data between said first and second RAMs, and between said first and second processors without interference of program execution by said processors;
    (d) a third bus being coupled to a third plurality of units which includes at least a third RAM and a third processor;
    (e) at least one LAN adapter connected to said second bus for interfacing a LAN thereto, and data being transmitted to and from said third RAM and a LAN via said second portion of said second RAM by direct memory access under control of said first processor which controls said DMA controller; and
    (f) second means for coupling said third bus to said second bus for separating said third RAM and said third processor from said second bus while permitting the flow of data and control signals between said third and said second busses, said control signals being used by said first processor to control transmission of data between said third RAM and said LAN.

2. The LAN system as recited in claim 1 wherein said first coupling means comprises transceivers.

3. The LAN system as recited in claim 2 including a first-in-first-out (FIFO) memory coupled to said second bus for transferring information from said first bus into said FIFO memory.

4. The LAN system as recited in claim 2 wherein said second RAM is a buffer memory and wherein said second processor transfers the information stored in said FIFO memory to said second RAM, while said first processor executes processes stored in said first RAM.

5. The LAN system as recited in claim 4 wherein said third bus includes an address bus, a data bus and a first and second interface.

6. The LAN system as recited in claim 5 wherein said first interface is an address interface coupled to said address bus and to said second bus for transmitting/receiving addresses between said third bus and said second bus.

7. The LAN system as recited in claim 6 wherein said second interface is a data interface coupled to said data bus and to said second bus for transmitting/receiving data between said third bus and said second bus.

8. The LAN system as recited in claim 7 wherein said second bus is comprised of a control bus and a DMA bus, and wherein said control bus transmits/receives control signals for controlling said LAN and said DMA bus transmits/receives address and data signals to be transmitted between said third RAM and a LAN.

9. The LAN system as recited in claim 8 wherein said first processor is a microprocessor ($\mu$/P) and said first bus is comprised of a $\mu$/P control bus and $\mu$/P data and address busses, said $\mu$/P control bus for processing control signals to control said $\mu$/P and said $\mu$/P data and address busses transmitting/receiving address from/to said $\mu$/P.

* * * * *